United States Patent [19]

Alton

[11] Patent Number: 5,792,031
[45] Date of Patent: Aug. 11, 1998

[54] HUMAN ACTIVITY SIMULATOR

[76] Inventor: Michael J. Alton, 943 B LaMesa Terrace, Sunnyvale, Calif. 94086

[21] Appl. No.: 901,227

[22] Filed: Jul. 24, 1997

Related U.S. Application Data

[63] Continuation of Ser. No. 581,155, Dec. 29, 1995, abandoned.

[51] Int. Cl.$^6$ .................................................... A63B 26/00
[52] U.S. Cl. ............................. 482/78; 482/900; 482/901
[58] Field of Search ............................. 482/78, 900, 901, 482/902, 904; 434/55, 252, 253; 602/16, 23, 18

[56] References Cited

U.S. PATENT DOCUMENTS

| | | | |
|---|---|---|---|
| 1,393,456 | 10/1921 | Ruggles | 434/55 |
| 2,737,432 | 3/1956 | Jenks | 434/252 |
| 3,415,523 | 12/1968 | Boldt . | |
| 3,876,212 | 4/1975 | Oppenheimer | 434/252 |
| 3,912,260 | 10/1975 | Rice . | |
| 4,074,903 | 2/1978 | Diez de Aux . | |
| 4,303,041 | 12/1981 | Thompson . | |
| 4,396,189 | 8/1983 | Jenkins . | |
| 4,430,990 | 2/1984 | Whitehead . | |
| 4,490,810 | 12/1984 | Hon . | |
| 4,553,633 | 11/1985 | Armstrong . | |
| 4,720,064 | 1/1988 | Herndon . | |
| 4,817,950 | 4/1989 | Goo . | |
| 4,906,192 | 3/1990 | Smithard . | |
| 5,049,079 | 9/1991 | Furtado . | |
| 5,050,885 | 9/1991 | Ballard et al. | 434/252 |
| 5,112,044 | 5/1992 | Dubats . | |
| 5,272,984 | 12/1993 | Bolliger . | |

OTHER PUBLICATIONS

Elation; InterneTools; The Walt Disney Company; 3 pages.
Virtual Reality World; May/Jun. 1994; 8 pages.
Technical Support Package; National Aeronautics and Space Administration; 13 pages.

*Primary Examiner*—Lynne A. Reichard
*Attorney, Agent, or Firm*—Janet E. Muller; Flehr Hohbach Test Albritton & Herbert

[57] ABSTRACT

A simulation system for simulating a human activity. The simulation system includes a simulator (10, 120) including a support (12, 122) mountable to the torso of the body and an actuator assembly (14, 124, 126) which includes a storage device (18) having a model of the human activity stored therein. The actuator assembly (14, 124, 126) is positioned to engage the body and formed to produce motion of the body in simulation of the modeled activity. The simulation system also includes the method of simulating a human activity which includes the steps of supporting the body and driving an actuator assembly (14, 124, 126) to simulate the human activity using a model of the activity which is stored in a storage device (18) coupled to the actuator assembly (14, 124, 126).

52 Claims, 16 Drawing Sheets

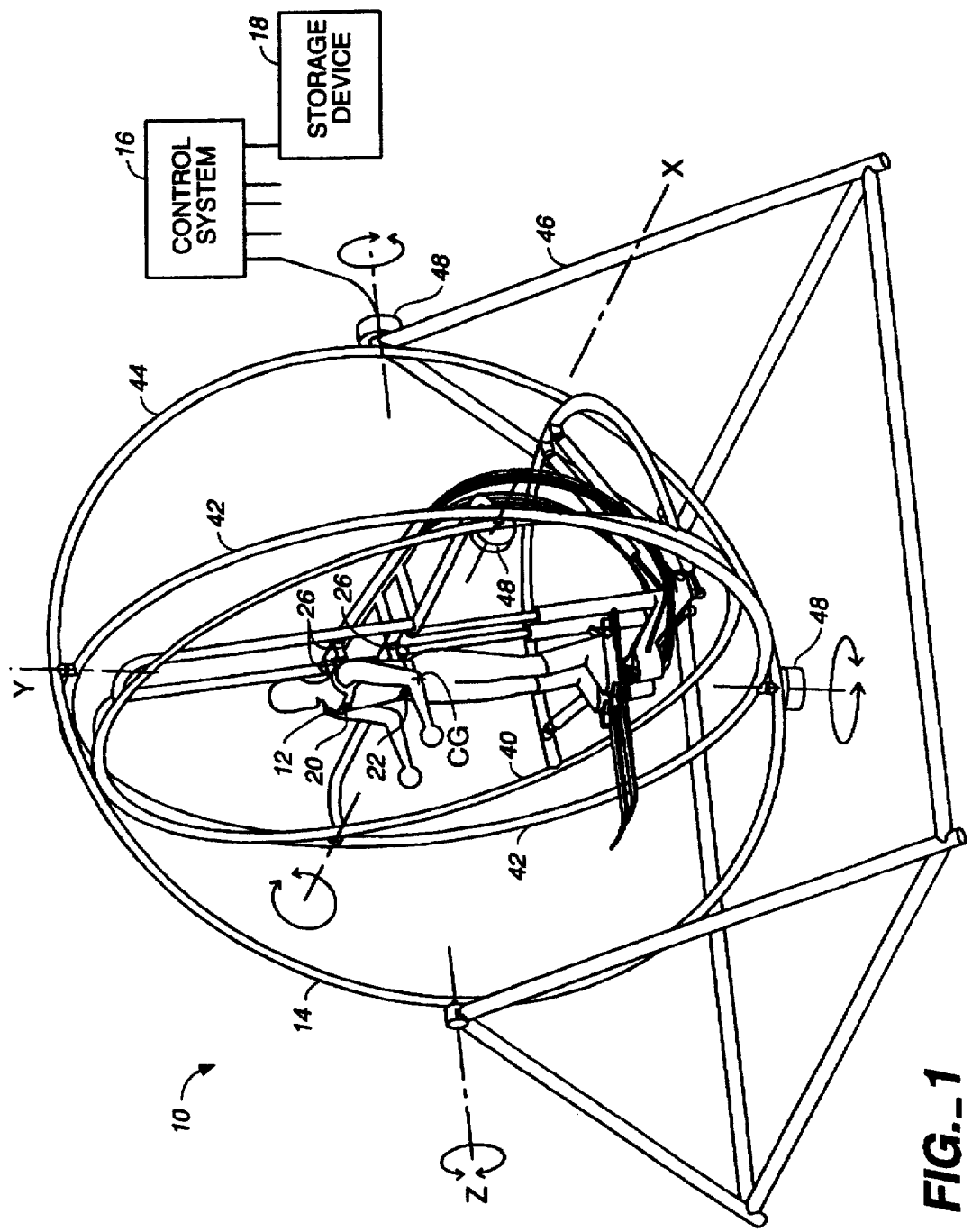
FIG._1

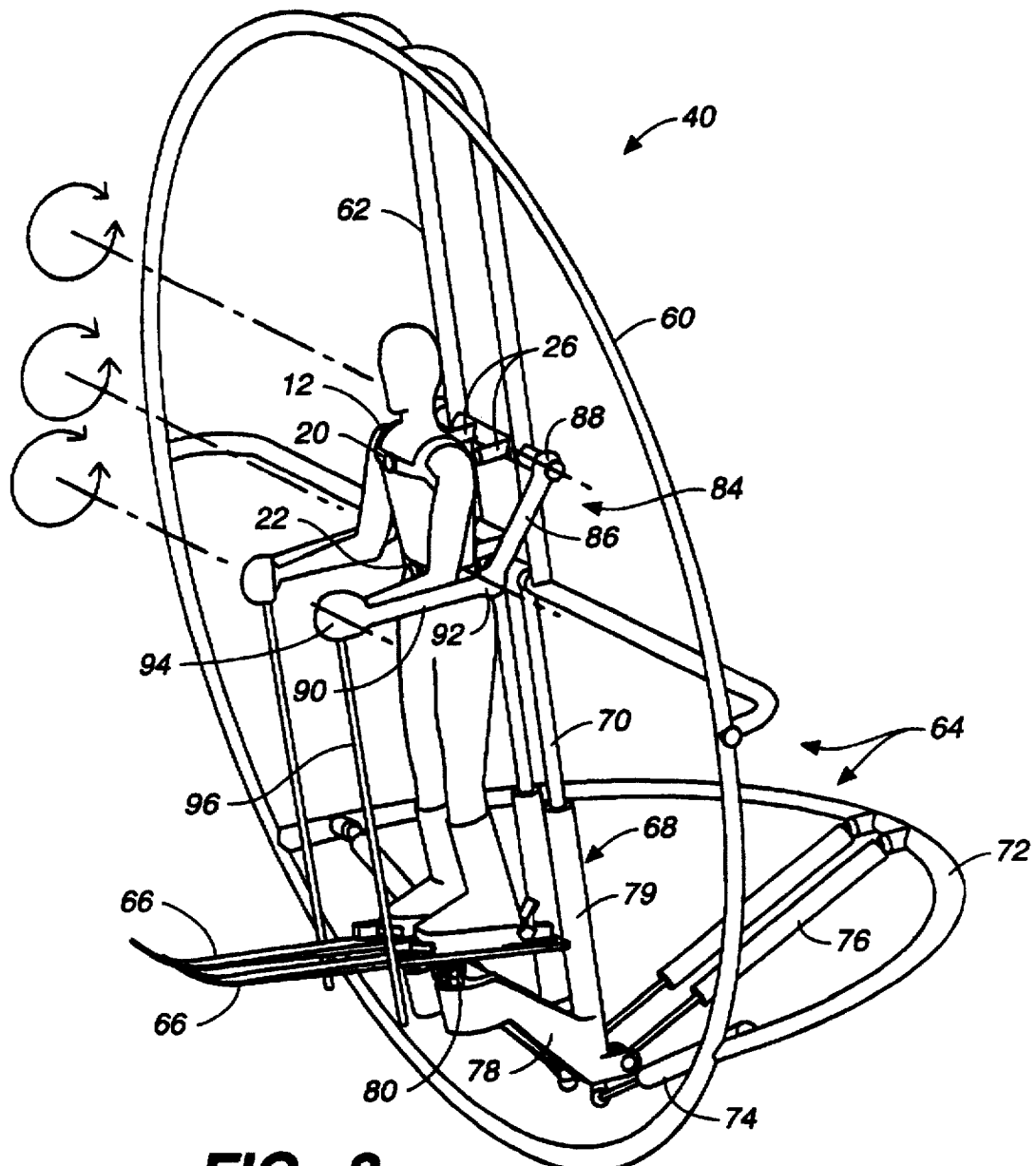
FIG._2

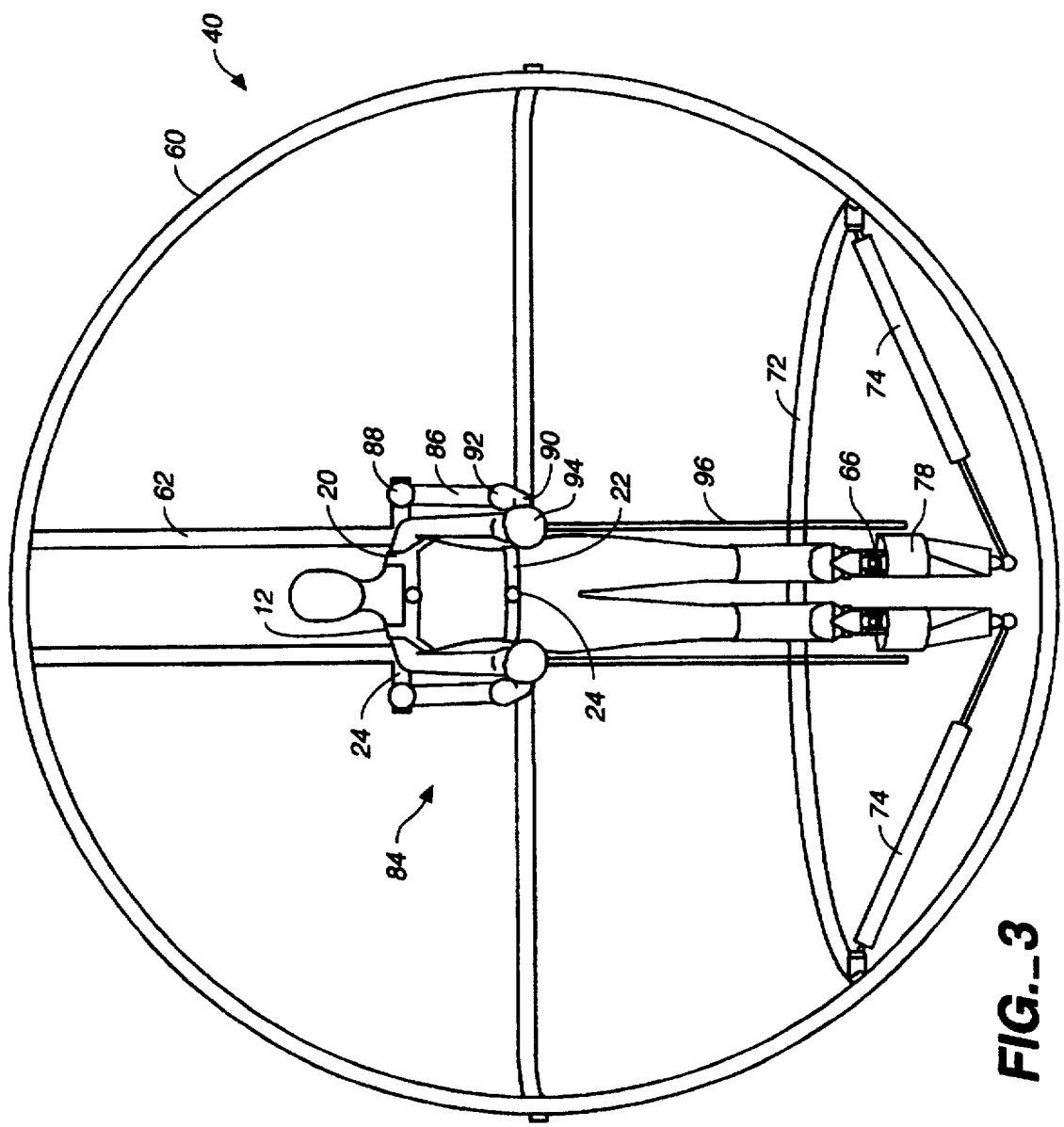
FIG._3

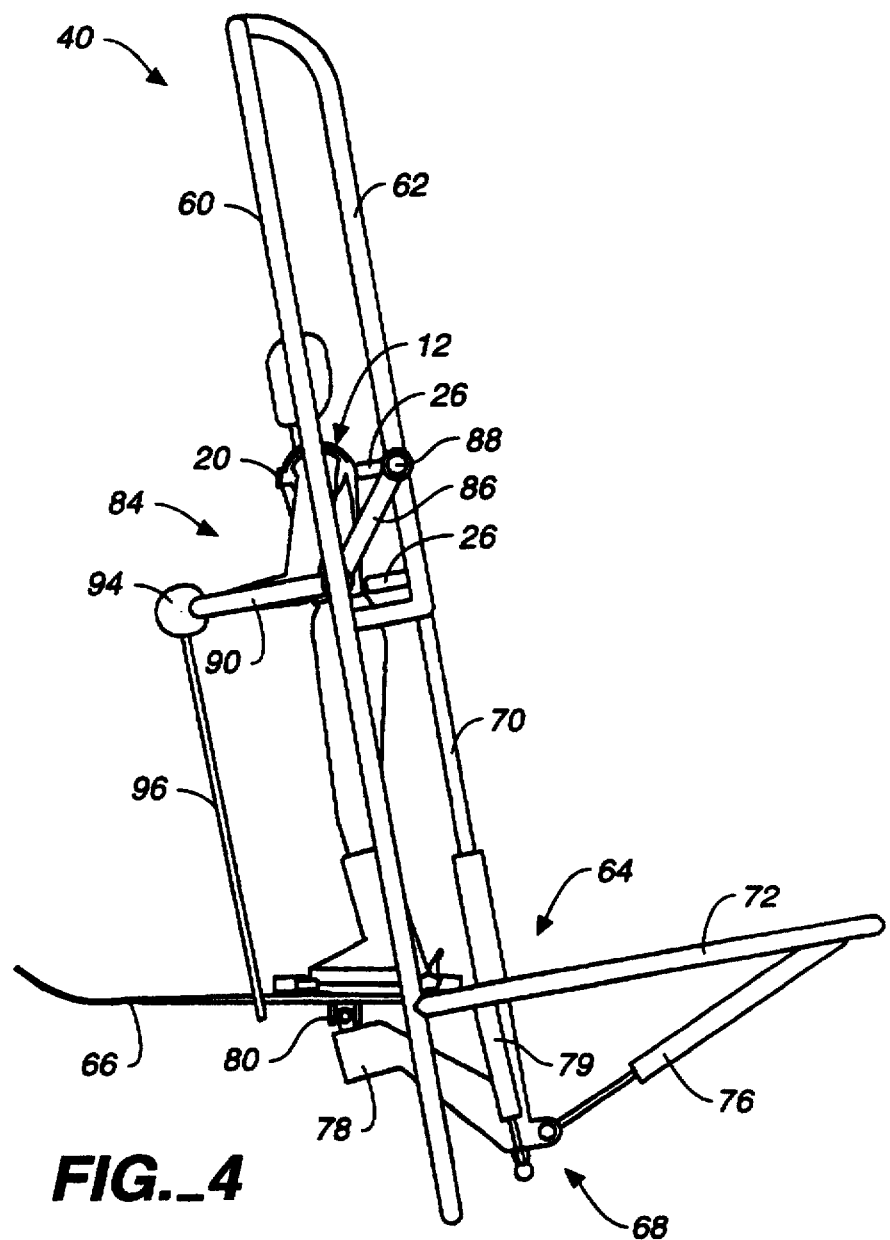
FIG._4

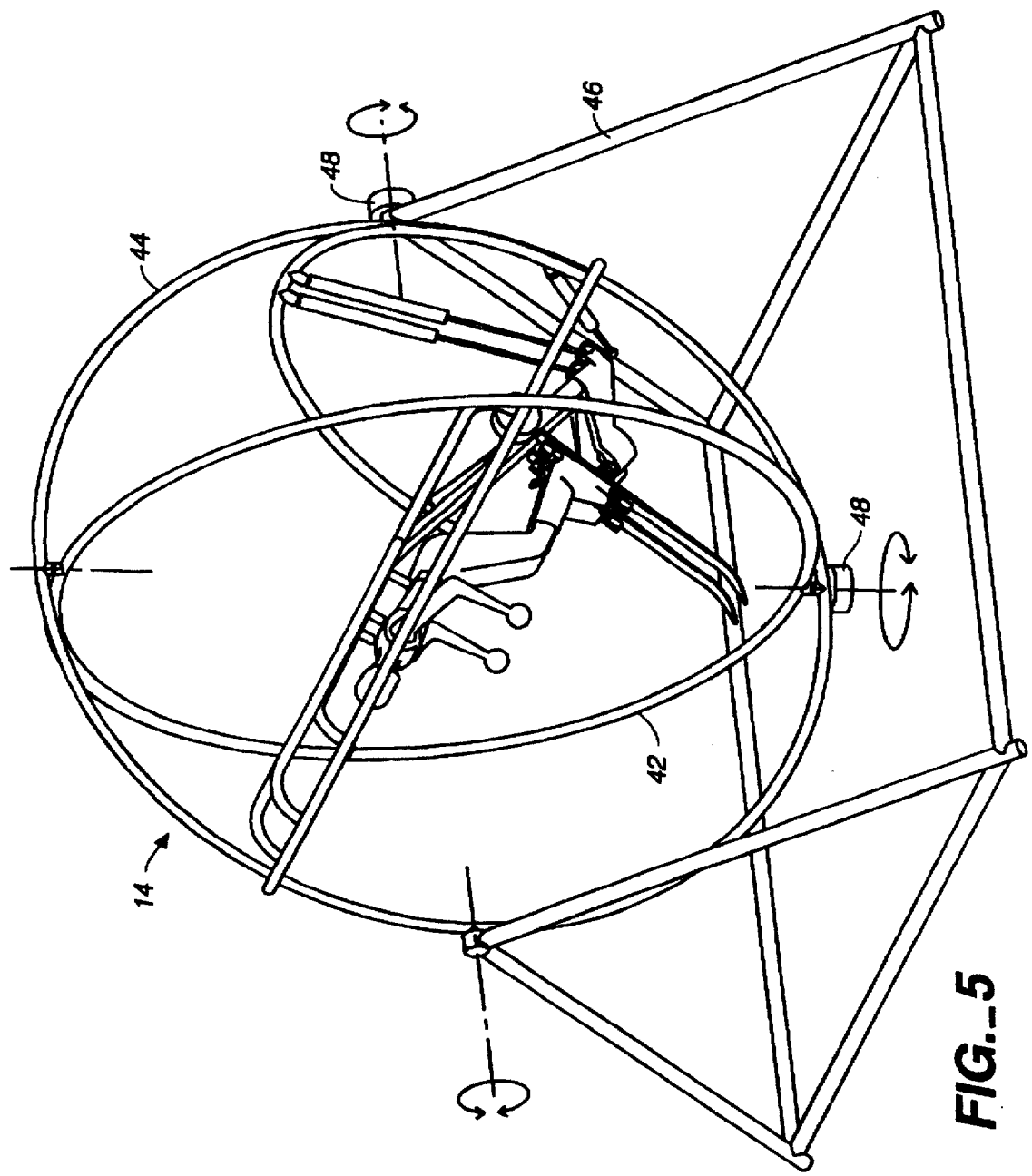

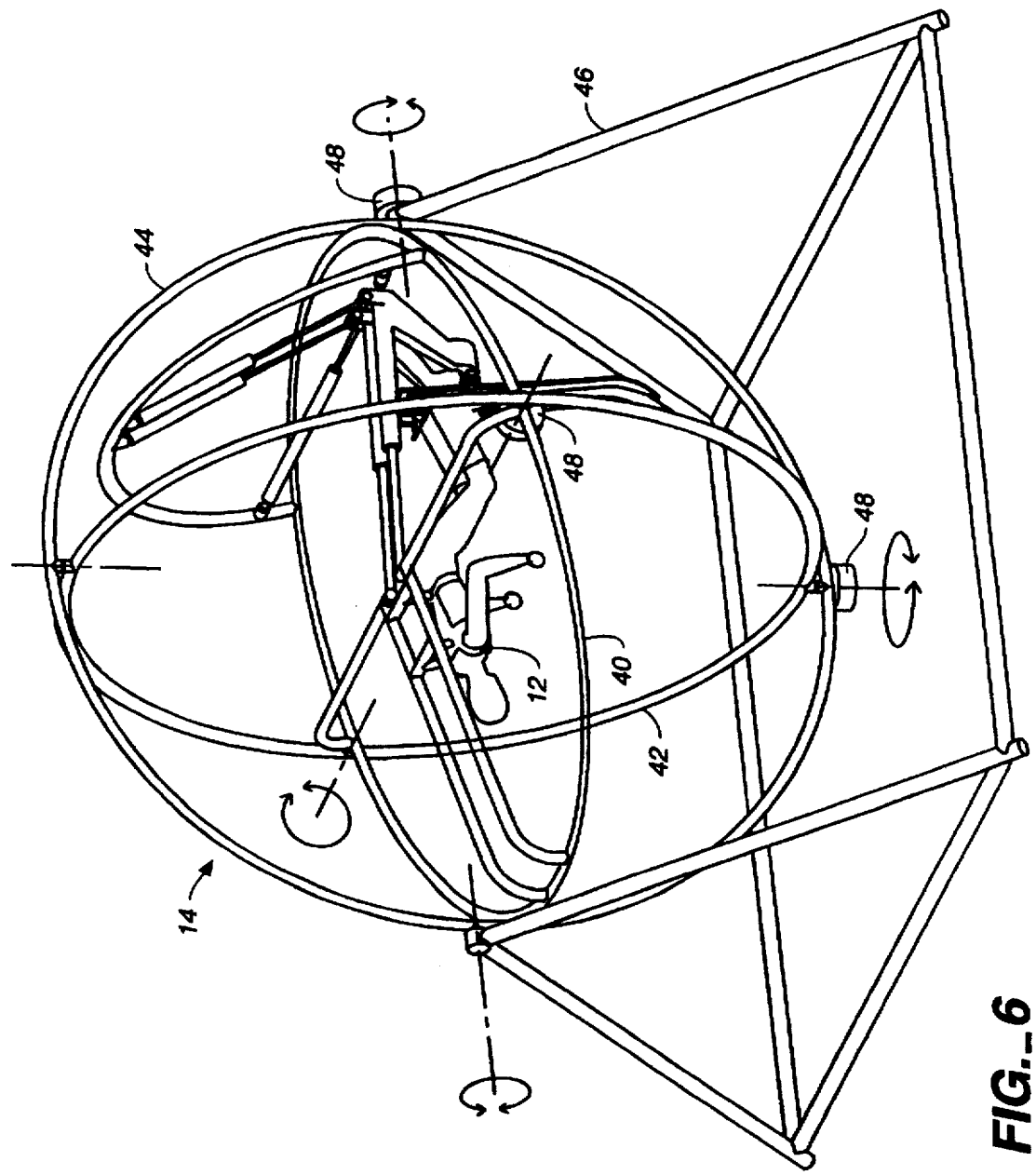
FIG._6

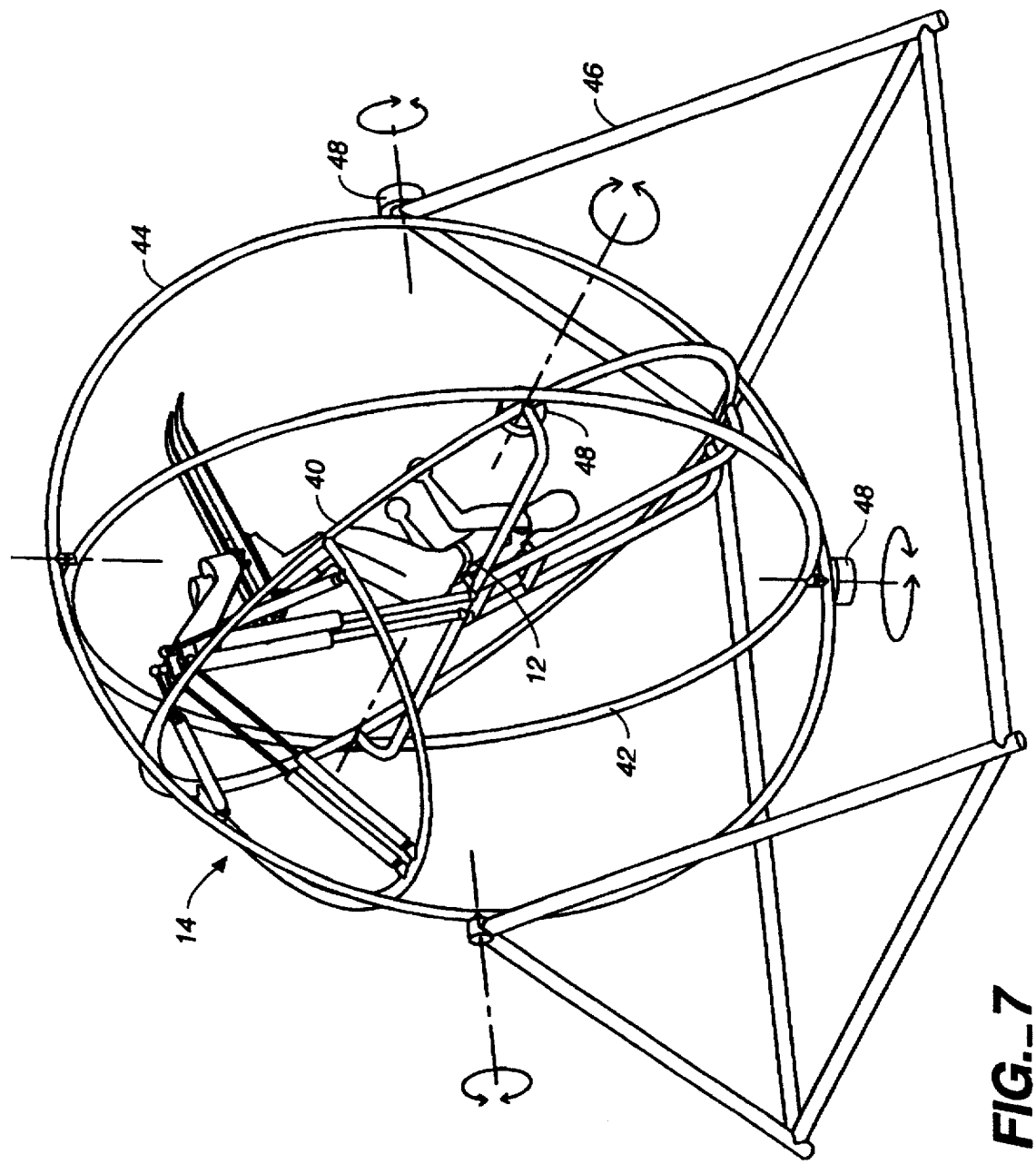
FIG._7

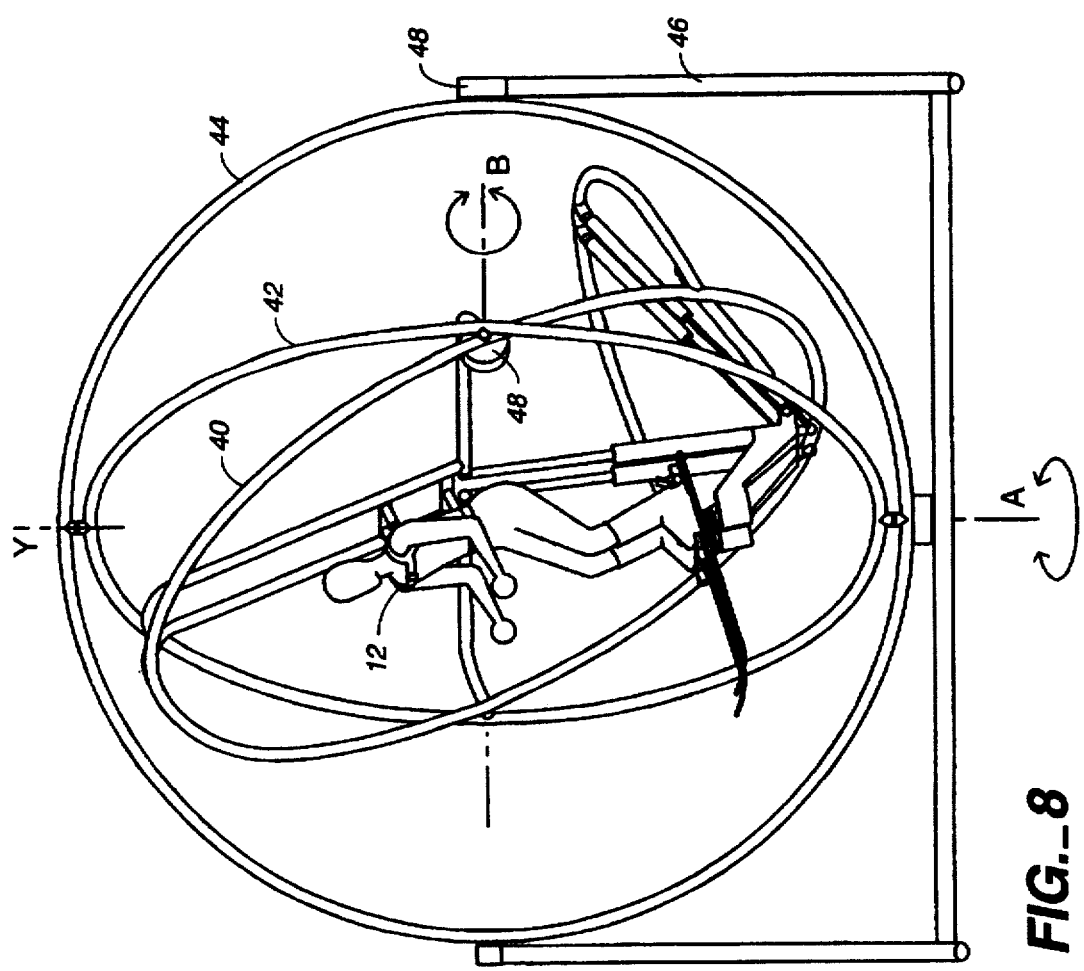
FIG._8

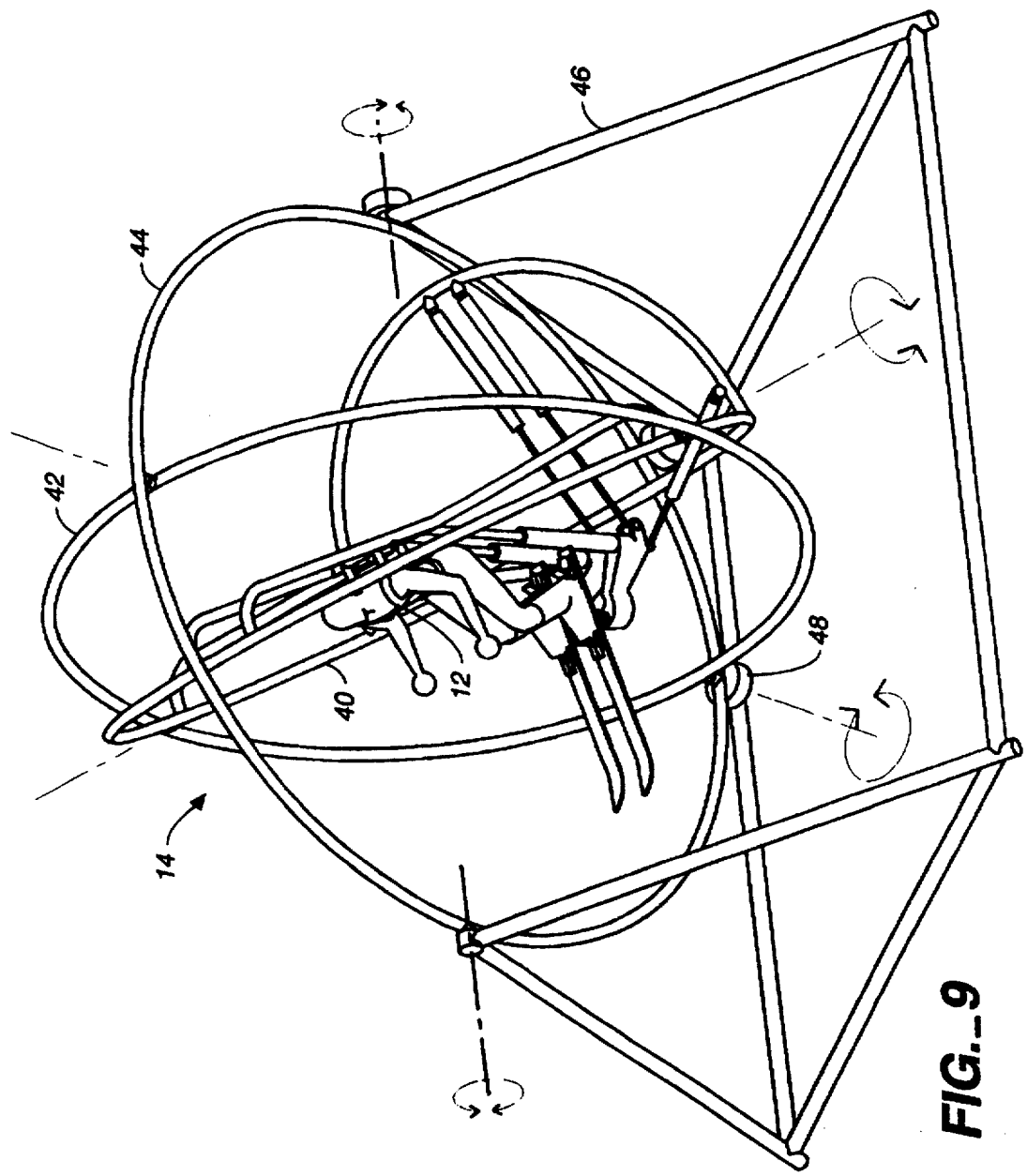
FIG._9

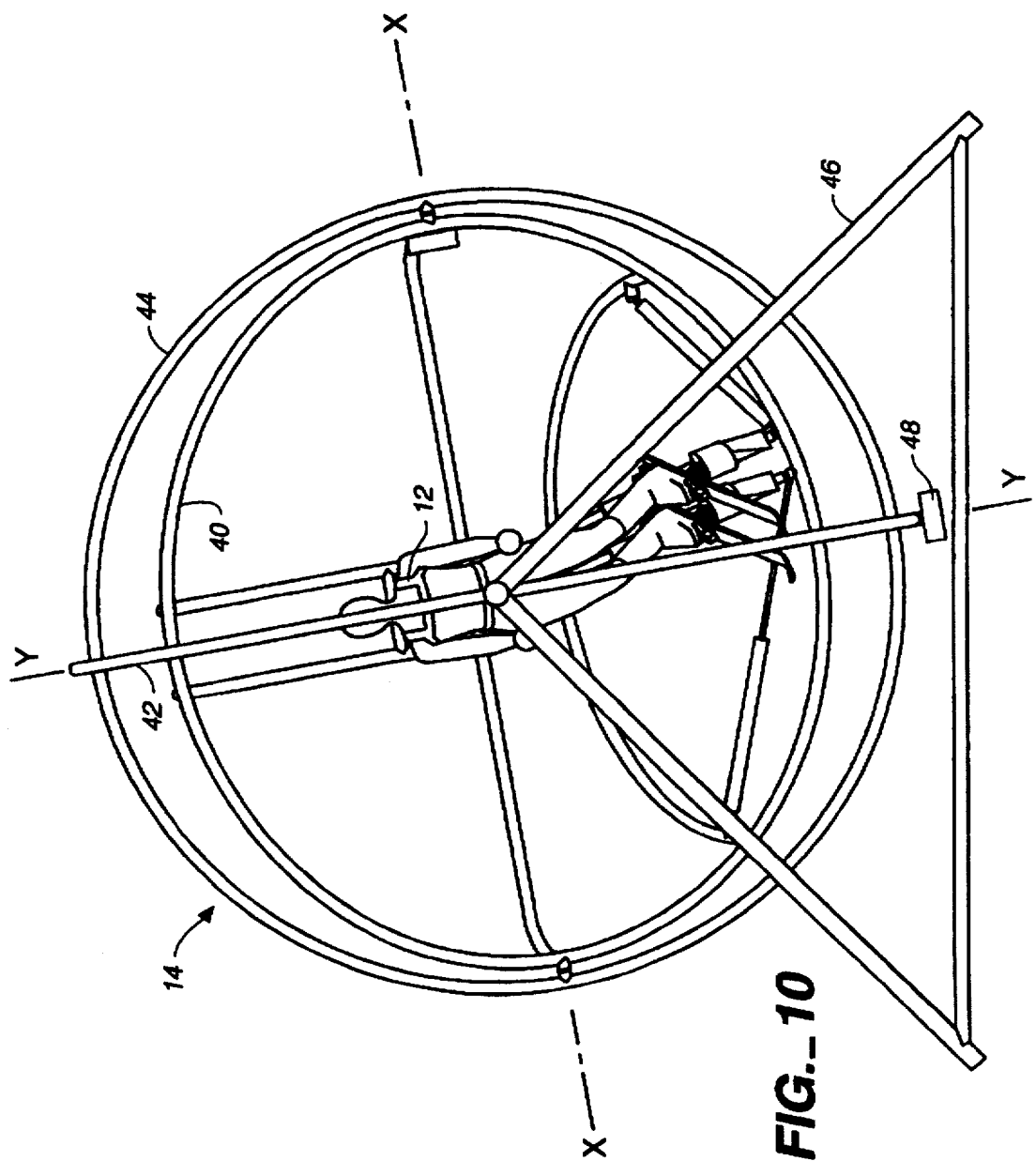
FIG._10

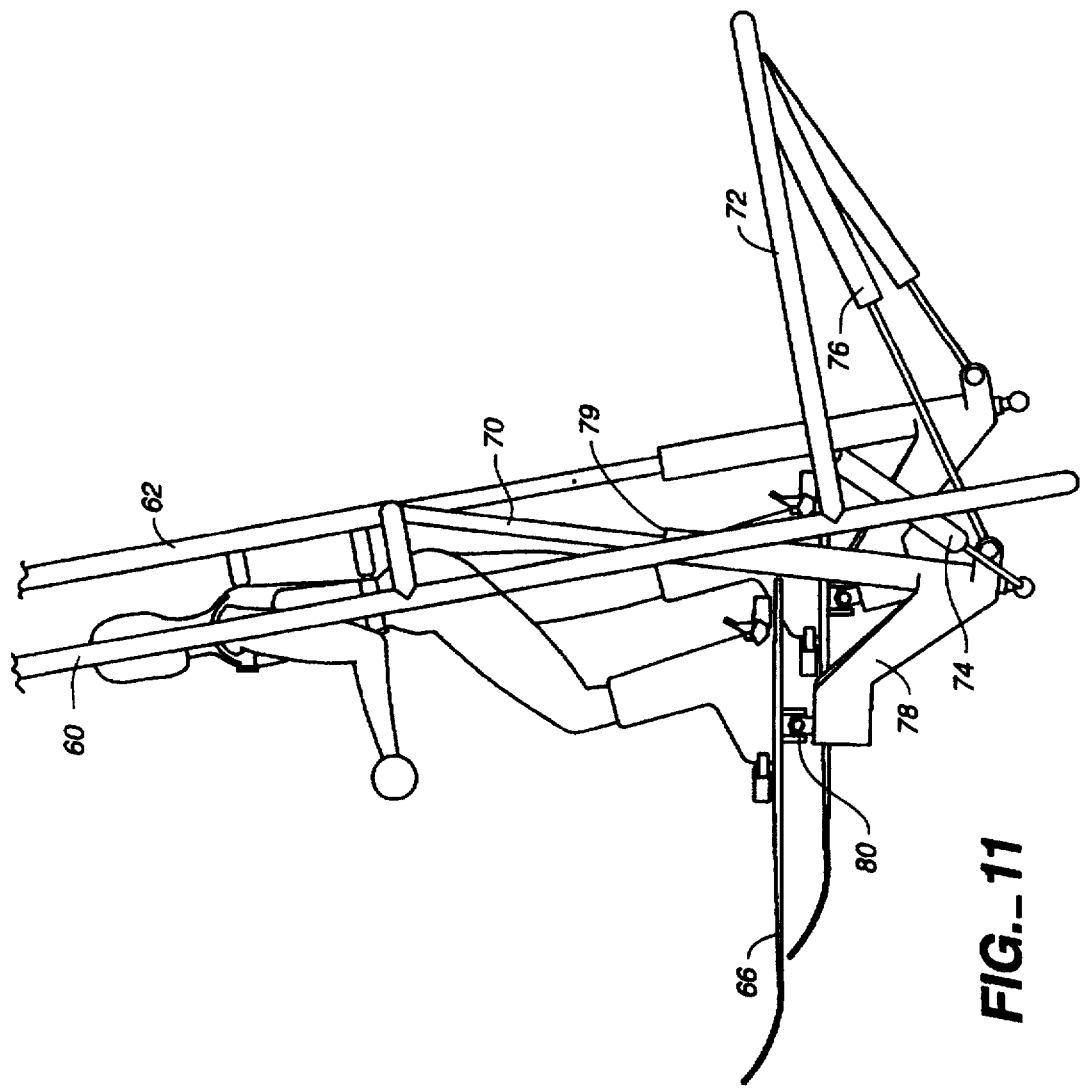

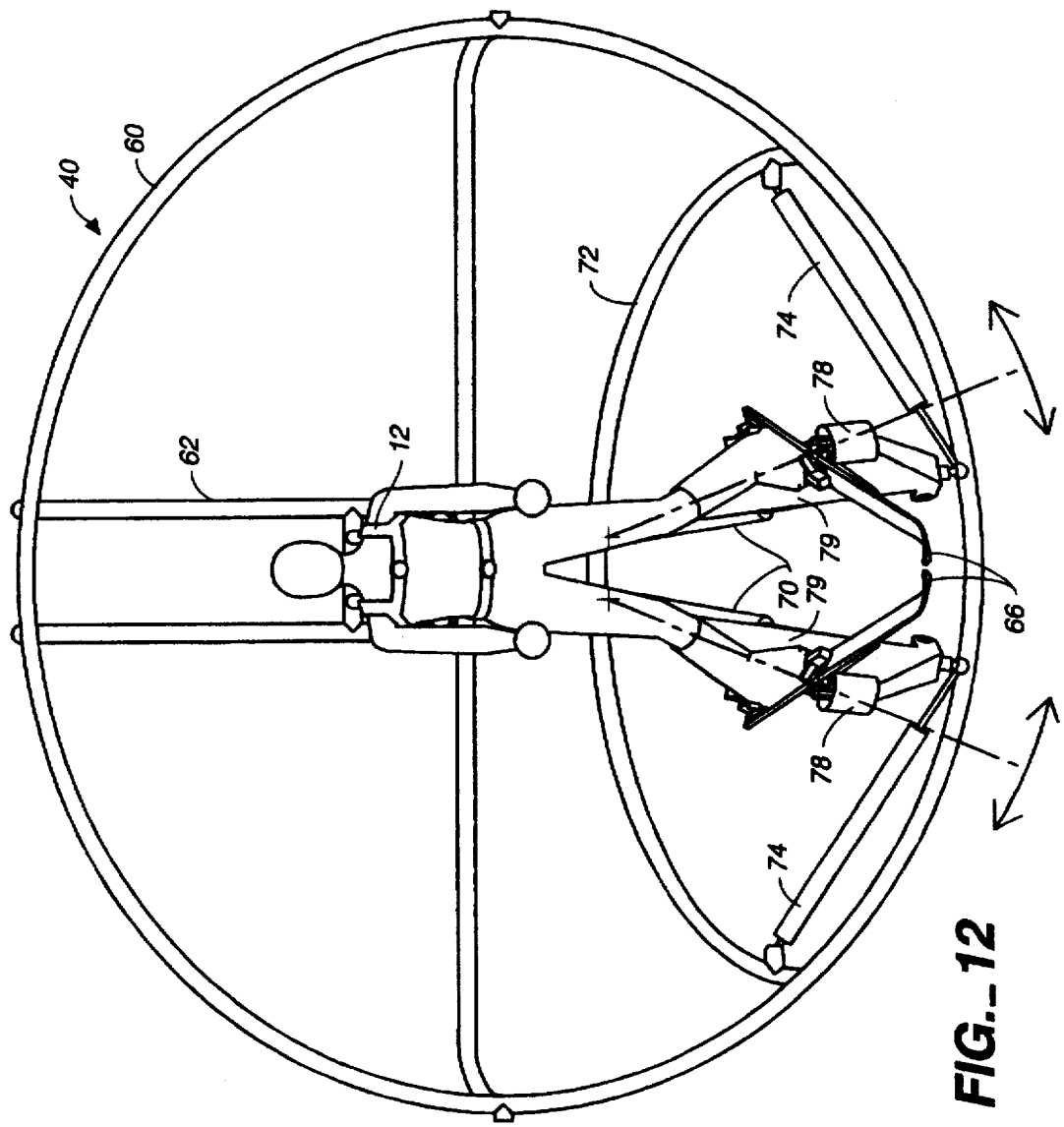
FIG._12

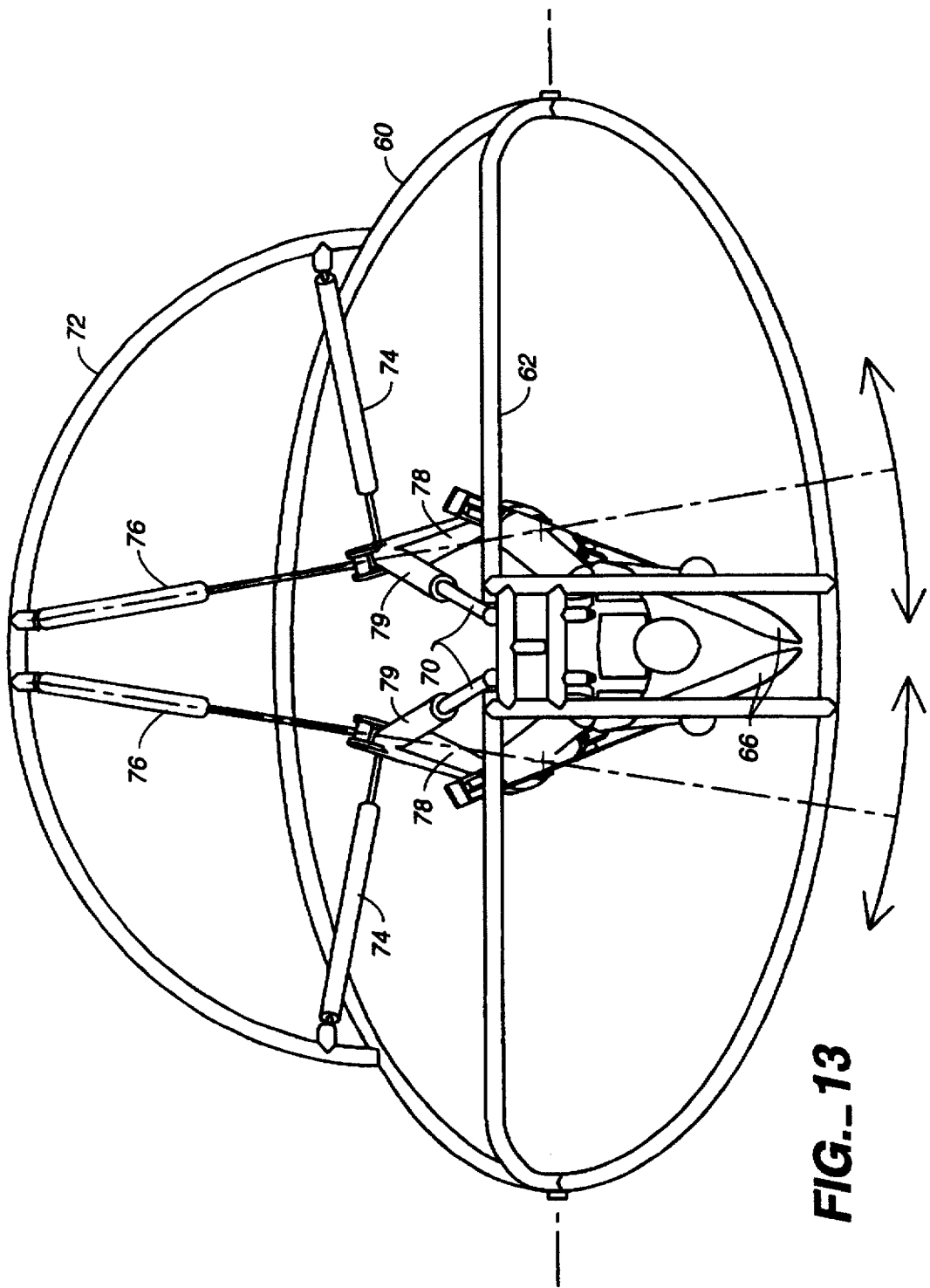
FIG._13

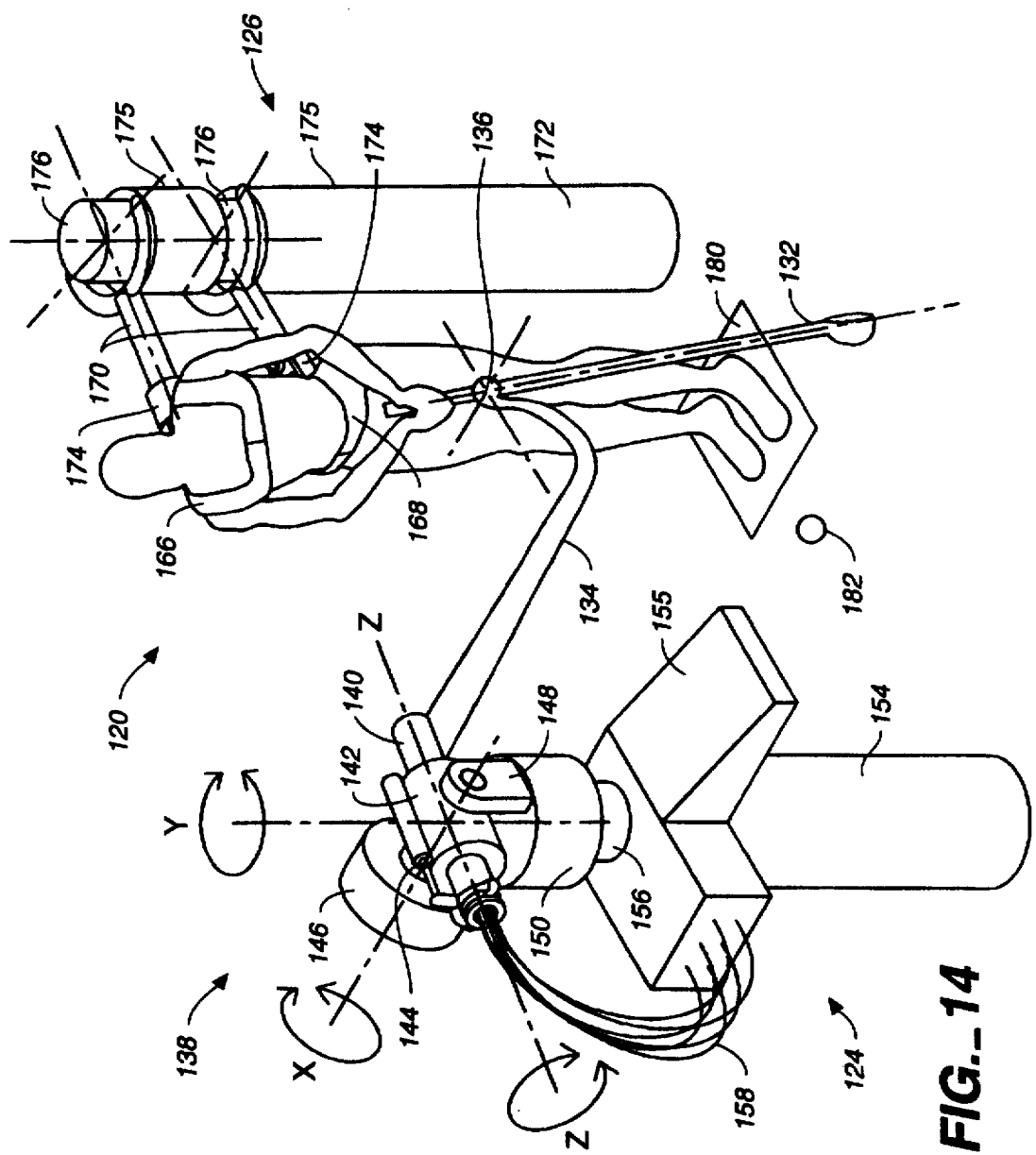

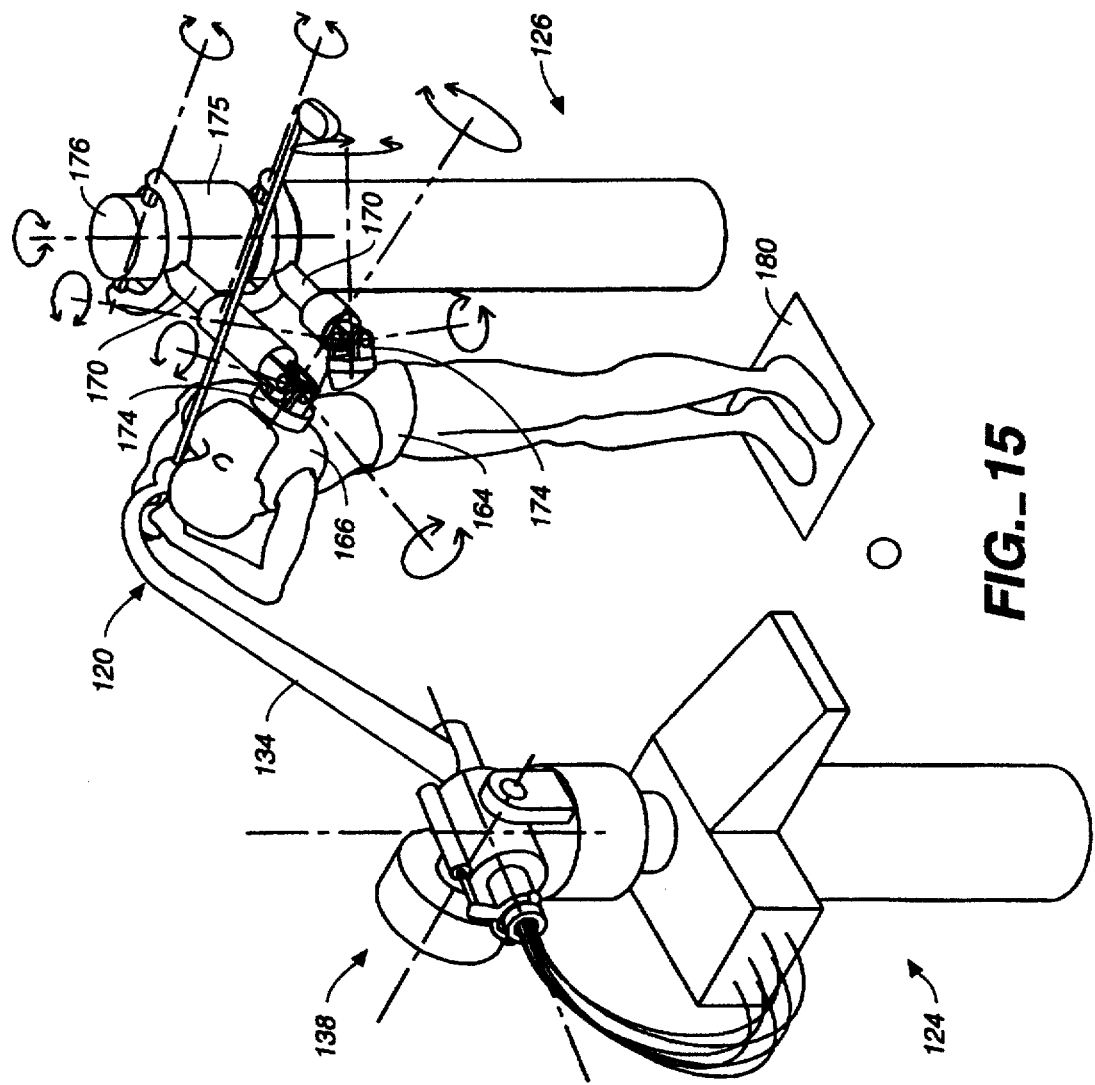
FIG._15

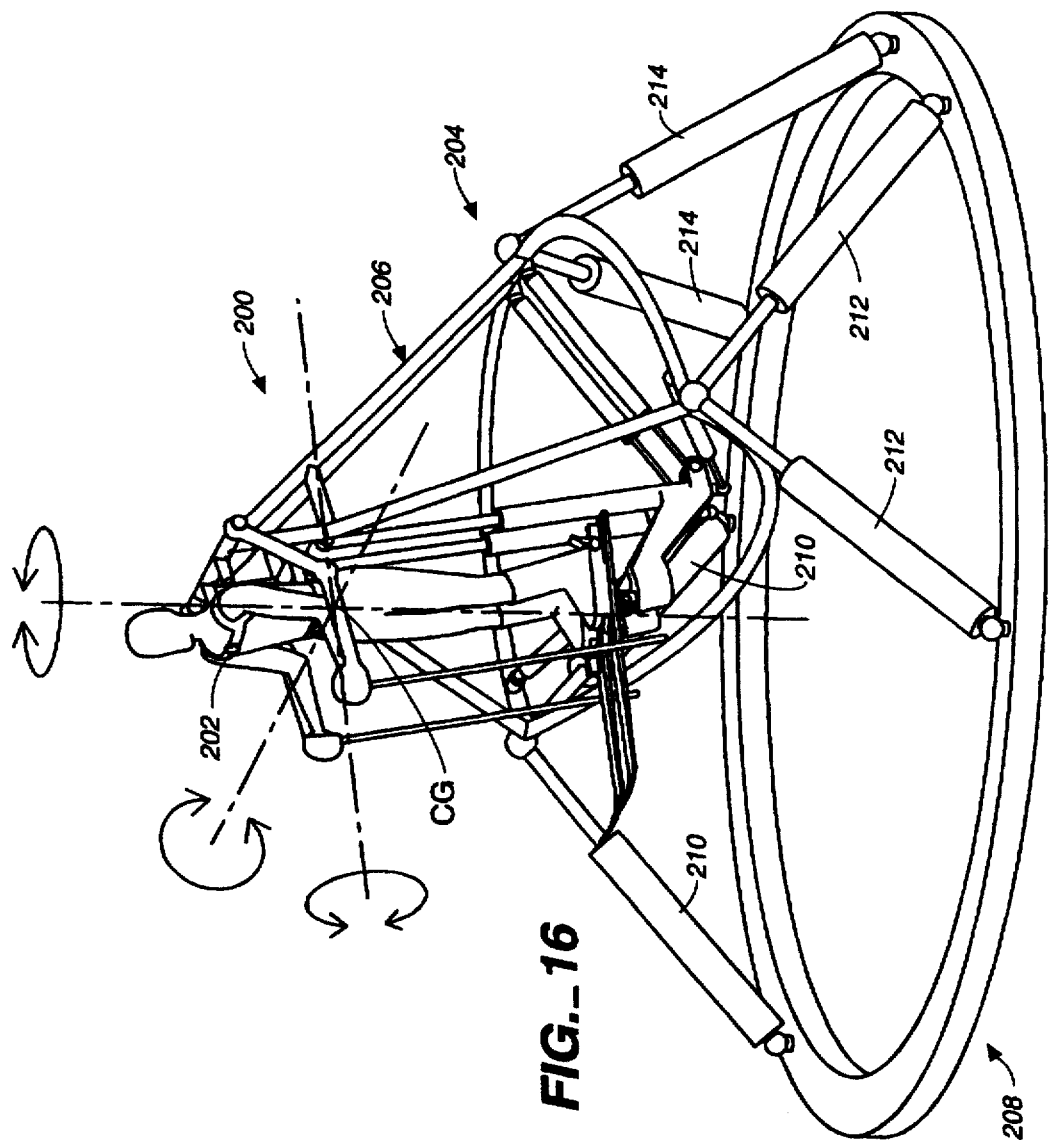
FIG._16

HUMAN ACTIVITY SIMULATOR

This is a continuation of application Ser. No. 08/585,155 filed Dec. 29, 1995 now abandoned.

TECHNICAL FIELD

The present assembly relates in general to a simulation system and more particularly to an apparatus and method of simulating a human activity.

BACKGROUND ART

Simulation systems provide a useful tool for training an individual to perform the required body movements for a particular activity. Since he is typically safely removed from the hazards associated with the activity, the individual may concentrate on learning the required body movements. As a result, the simulation systems are of particular use in the instruction of activities where the individual's inexperience limits his ability to participate in the activity or exposes him to potential injury or where his fears interfere with his ability to properly perform the required movements. The simulation systems also provide a source of entertainment, enabling an individual to experience the sensation of performing the activity regardless of their actual skill level. Simulation systems are useful in simulating activities such as skiing, surfing and other sports as well as basic body movements for rehabilitation purposes.

The ability of a simulation system to effectively function as an instructional tool or as a source of entertainment depends in part upon whether the simulation realistically reproduces the activity. Another factor is the degree to which the simulator controls and responds to the body movements of the individual. Typically, the proper body movements for a sport such as skiing and golf include movement of the arms, legs, hips and torso as well as the overall posture of the individual. During the actual activity, the body is often moved about its center of gravity relative to three different axes. The body movements are typically defined by translational and rotational movement with respect to the x-axis, y-axis and z-axis. A simulator which effectively controls each of these movements would expose the individual to a realistic simulation of the activity.

An example of a ski simulator is disclosed in U.S. Pat. No. 3,912,260. The disclosed simulator utilizes the rotational movement of a turntable base to simulate turns and a pivotal rocker support carried by the base to simulate upward and downward movement. Swivel supports are used to pivotally mount a pair of skis to the base. Although the simulator may be used by an experienced skier to practice his technique, the apparatus may not be suitable for beginners as the apparatus exerts minimal control over the individual's body movements. Since this control is focused on the individuals feet, the beginner will receive little guidance on the proper movement of the knees, hips, arms, torso and the overall posture required as he skis down a slope. He may even risk injury if he reacts improperly to the motion of the simulator base. Moreover, the disclosed simulator may not realistically duplicate the rough and uneven terrain of the ski slope.

U.S. Pat. Nos. 4,396,189 and 5,049,079 disclose additional examples of ski simulators in which the movement is created by platform devices which move the individual's feet. However, as with the apparatus disclosed in U.S. Pat. No. 3,912,260, the simulators do not actively control the movement and position of the athletes arms, legs and torso. Moreover, the realism of the simulation is limited in that the platform devices may not accurately and realistically reproduce the slope terrain. U.S. Pat. No. 3,531,110 discloses a simulator in which the user induces the motion of the platform when he practices various skiing maneuvers. Since the platform is not driven, the simulator may not reproduce a ski slope.

A simulation system which controls the arm, leg and torso movements as well as the posture of the individual is desirable for safely and efficiently training an individual to ski. A simulation system which reproduces the translation and rotation displacement relative to the x-, y-, and z-axes for each movement would provide the individual of a more realistic experience during the simulation. A simulation system which accurately and realistically reproduces the terrain of the ski slope would enhance the individual's enjoyment of the experience as well as more prepare the individual for the environmental conditions of the actual activity.

Video images have been employed in simulation systems enhance the simulation of the activity. U.S. Pat. No. 4,074,903 discloses an example of a simulator in which instructions and information about the slope are projected on a screen. The simulator disclosed in U.S. Pat. No. 4,906,192 measures the individual's movements on a support platform and reproduces his skiing track on the screen of a video display. Although the skier may use the video image to monitor his progress along the slope, the simulator does not realistically reproduce the visual image which would be viewed by the skier if he were actually skiing down the slope. A simulator including a visual display which accurately reproduces the scenery, such as the ski slope, viewed by an actual participant in the activity is desirable.

Many of the disclosed simulation systems include control systems programmed to drive the systems, moving the platform of the system to simulate a selected skiing maneuver. Although some of the control systems may include various options and skill levels, the programmed movements are not tied to those of an actual participant performing the activity. A simulation system which uses a recorded of an actual participant in the activity as a model for the simulation is desirable.

Various virtual reality systems combine a support apparatus with a computer generated audio and visual environment. The individual manipulates the support apparatus in response to the computer environment, for example by shifting their weight, with the movement of the support apparatus being incorporated into the environment generated by the computer. Although the support apparatus reacts to the user's movements, the apparatus does not control or manipulate the individual's movements. U.S. Pat. No. 4,817,950 discloses an example of a video game which utilizes a support apparatus to control the action of the figure in the game. As with the virtual reality systems, the support apparatus of the video game does not control the user's body movements during the activity.

The disclosed simulation systems support the feet of the individual. Any motion induced by the simulators is imparted to the individual's feet. The individual must perform the required knee, hip, torso and arm movements while retaining his balance. Although most systems include safety harnesses, the harnesses are not used to manipulate the individual's body. U.S. Pat. Nos. 4,720,064 and 5,272,984 disclose harnesses for substantially confining the individual in a seat. U.S. Pat. Nos. 4,430,990 and 4,553,633 disclose harnesses which permit substantially unrestricted movement of the individual while wearing the device. However, none of the references disclose supporting the individual in a harness and moving his body relative to the harness. Various therapeutic devices support the torso of the individual for rehabilitative purposes. U.S. Pat. No. 4,303,041 discloses a supportive body harness for supporting an invalid during a walking exercise. U.S. Pat. No. 5,112,044 and NASA Technical Brief No. GSC-13348 disclose supportive devices for patients who are experiencing diminished mobility. Although the therapeutic devices support the torso of the individual, the references do not disclose moving the individuals body relative to the supportive devices.

DISCLOSURE OF THE INVENTION

Accordingly, it is an object of the present invention to provide a simulation apparatus for realistically simulating a human activity.

Another object of the invention is to provide a simulation apparatus which manipulates the individual's body in simulation of the human activity.

Yet another object of the invention is to provide a simulation apparatus which engages the torso and manipulates the arms, legs and torso in simulation of the human activity.

Another object of the invention is to provide a simulation system which produces movement of the body about its center of gravity relative to three axes.

Yet another object of the invention is to provide a simulation system which produces translational and rotational movement relative to the x-axis, y-axis and z-axis.

Still another object of the invention is to provide a simulation system which uses a recording of an actual participant in the activity as a model for the simulation.

A further object of the invention is to provide a simulation apparatus which includes a video image of the scenery viewed by an individual actually participating in the activity which is simulated by the simulation system.

A more general object of the invention is to provide a simulation system which accurately and realistically reproduces a desired activity for efficiently instructing an individual in the required body movements of the activity and enhancing the entertainment of the individual during the simulation.

The human activity simulation apparatus and method of the present invention have other features and objects of advantage which will become apparent from and are set forth in more detail in the following Best Mode of Carrying Out the Invention and the accompanying drawings.

In summary, the human activity simulator of the present invention generally includes a simulation apparatus and a method of simulating a human activity. The simulation apparatus comprises a support mountable to the torso of the body and an actuator assembly which includes a storage device having a model of the human activity stored therein. In one embodiment of the invention, the actuator assembly is positioned to engage the body and formed to produce motion of the body in simulation of the modeled activity. In another embodiment, the actuator assembly is coupled to the support and formed for movement of the support about three perpendicular axes in simulation of the activity.

The method of the present invention generally includes the steps of supporting the body and driving an actuator assembly to simulate the human activity using a model of the activity which is stored in a storage device provided in the actuator assembly. In one modification of the invention, the method includes supporting the body on an actuator assembly formed for manipulation of the body and the driving step includes driving the actuator assembly to produce motion of the body as determined by the activity model. In another modification of the activity, the supporting step includes mounting a support to the torso and the driving step includes producing motion of the support relative to at least one of three perpendicular axes in simulation of the modeled activity.

The simulator of the present invention may be used to simulate activities in which the user moves across a surface, such as skiing or ballroom dancing. The simulation system may also be used for stationary activities in which the user essentially remains in one location during the activity such as when swinging a golf club. The simulator may also be used during rehabilitation to simulate walking and other basic leg and arm movements, and the like.

BRIEF DESCRIPTION OF THE DRAWINGS

FIG. 1 is a schematic, orthogonal view of a simulator constructed in accordance with one embodiment of the present invention.

FIG. 2 is a schematic, orthogonal view of the inner frame member of the simulator of FIG. 1.

FIG. 3 is a schematic front plan view of the inner frame member shown in FIG. 2.

FIG. 4 is a schematic side plan view of the inner frame member shown in FIG. 2.

FIGS. 5–7 are schematic, orthogonal views of the simulator of FIG. 1 showing different stages during the simulation of a somersault.

FIG. 8 is a schematic, side plan view of the simulator of FIG. 1, shown with the simulator turning the user to the left.

FIG. 9 is schematic, orthogonal view of the simulator of FIG. 1, shown with the simulator tilting the user to the right.

FIG. 10 is a schematic, side plan view of the simulator of FIG. 1, shown with simulator positioning the user in a parallel turn to the right.

FIG. 11 is an enlarged, side plan view of the inner frame member of the simulator of FIG. 1, shown with the simulator lifting the user's left leg.

FIG. 12 is a schematic, front plan view of the inner frame member of the simulator of FIG. 1, with the simulator positioning the user in the snow plow position.

FIG. 13 is a top plan view taken substantially along the line 13—13 in FIG. 12.

FIGS. 14 and 15 are schematic, orthogonal views of a simulator constructed in accordance with another embodiment of the present invention, shown at different stages during the simulation.

FIG. 16 is a schematic, orthogonal view of a simulator constructed in accordance with yet another embodiment of the present invention.

BEST MODE OF CARRYING OUT THE INVENTION

Reference will now be made in detail to the preferred embodiments of the invention, which are illustrated in the accompanying Figures. Turning now to the drawings, wherein like components are designated by like reference numerals throughout the various figures, attention is directed to FIG. 1.

FIG. 1 shows a simulator 10, constructed in accordance with the present invention, which is particularly suitable for simulating an activity such as skiing. Simulator 10 generally includes a harness 12 mountable to the torso and an actuator assembly 14 configured to produce movement of the body in simulation of the modeled activity. Preferably, actuator assembly 14 may be used to produce several types of movement including the manipulation of one or more of the limbs, movement of one or more of the limbs relative to the torso, movement of one portion of the torso relative to another such as the relative movement of the shoulders and hips, and the pivotal or rotational movement of the body about its center of gravity CG. Actuator assembly 14 offers six degrees of freedom, with the types of movement produced by assembly 14 each consisting of a combination of translational and rotational movements relative to three perpendicular axes. Through a combination of these movements, actuator assembly 14 may be used to create the sensation of moving or traveling across a surface, simulating experiences such as, for the skiing application, riding in a chair lift, jumping to the ground, and skiing down a slope. The ability to produce each of these movements allows simulator 10 to recreate the entire experience of the simulated activity for the individual. Operation of actuator assembly 14 is controlled by a control system 16 having a model of the human activity retained in a storage device 18 (FIG. 1). As is described in more detail below, control system 16 drives actuator assembly 14 to reproduce the activity model stored in storage device 18.

Harness 12 engages the body of the user and provides the fixed point about which the various body movements are generated. As is shown particularly in FIGS. 1–4, harness includes an upper strap assembly 20 extending across the shoulders and around the upper chest area. A lower strap assembly 22 wraps around the waist area of the user. Strap assemblies 20 and 22 preferably include buckles 24 or other suitable adjustment means to provide a secure fit on the user's torso as is known in the art. Coupling devices 26 mount harness 12 to actuator assembly 14 at three points which are located in the general area of the shoulders and lower back. However, it is to be understood that the number and position of coupling devices 26 may be varied. For example, harness 12 may include additional straps which engage the hips or legs of the user and are which are mounted to actuator assembly 14 by one or more coupling devices 26. Such a harness would offer the advantages of additional comfort and increased safety. In the present embodiment, coupling devices 26 are provided by ball joints, although other suitable means may be used to mount harness 12 to actuator assembly 14.

Harness 12 securely and safely holds the user in the desired location during operation of actuator assembly 14. As is shown particularly in FIG. 1, in the present embodiment the user is positioned with the center of gravity CG of the body substantially aligned with the intersection of the x-, y- and z-axes, facilitating the production of movement about one or more of the x-axis, y-axis, and z-axis. Harness 12 also retains the torso in a fixed position, with actuator assembly 14 moving one or more of the limbs relative to the torso. Engaging the torso of the user with harness 12 also facilitates the manipulation, for example bending or turning, of the arms and legs.

In the embodiment shown in FIGS. 1–13, actuator assembly 14 generally includes three ring-shaped frame members 40, 42 and 44 carried by a support structure 46. The centers of each of frame members 40, 42 and 44 are substantially aligned with the center of gravity CG and the intersection of the x-, y- and z-axes. Harness 12 is mounted to inner frame member 40 which is pivotally coupled by gimbal-type mounting to intermediate frame member 42 for movement of inner frame member 40 relative to intermediate frame member 42 about the x-axis. Intermediate frame member 42 is in turn pivotally coupled by a gimbal-type mounting to outer frame member 44 for movement of frame member 42 relative to frame member 44 about the y-axis. Outer frame member 44 is pivotally mounted by a gimbal-type mounting to support structure 46 for movement of frame 44 relative to the support structure about the z-axis. In the present embodiment, the gimbal-type mounting is provided by rotary bearings although it is to be understood that other suitable means may be used. The person supported in harness 12 may be moved about one or more of the axes through the relative pivotal movement of the appropriate frame members 40, 42 and 44.

Actuator assembly 14 includes suitable means for producing the relative pivotal motion of frame members 40, 42 and 44. One such means is provided by rotary actuators 48 carried by frame members 40, 42 and 44. As is shown particularly in FIG. 1, rotary actuators 48 are mounted to one of the rotary bearings associated with each of the frame members 40, 42 and 44. Frame members 40, 42 and 44 may be pivoted about the x-, y-, and z-axes, respectively, by selectively actuating rotary actuators 48. In a preferred embodiment of the invention, each frame member may be rotated in excess of 360° by rotary actuators 48 so that simulator 10 may be used to simulate acrobatic maneuvers such as flips, spins, somersaults and the like. The simulation of a somersault is schematically illustrated in FIGS. 5–7. Rotary actuators 48 may be electrically, pneumatically or hydraulically operated.

By selectively actuating the appropriate rotary actuators 48, actuator assembly 14 may produce the desired pivotal or rotational movement about the center of gravity CG to orient the user in the desired position for the activity. For example, pivoting intermediate frame member 42 relative to outer frame member 44 in the direction of arrow A and simultaneously pivoting inner frame member 40 relative to intermediate frame member 42 in the direction of arrow B to the position schematically shown in FIG. 8 will provide the sensation of traveling down a slope which gradually descends to the left. In FIG. 9, the skier has been pivoted about 30 degrees about the z-axis. FIG. 10 schematically illustrates the position of the skier after he has been moved into a parallel turn to the right. The outer frame member 44 has been pivoted about 10 degrees relative to the z-axis to simulate the leaning sensation the skier experiences during an actual turn. Through the independent actuation of rotary actuators 48, frame members 40, 42 and 44 may each be pivoted to a position selected to simulate a desired movement.

Turning to FIGS. 2–4, inner frame 40 of actuator assembly 14 will be described in greater detail. Inner frame member 40 generally includes an annular ring 60 and a harness support 62 to which harness 12 is mounted. Harness support 62 is configured so that harness 12 is coplanar with the plane of ring 60 to ensure that the center of gravity CG of the user is substantially aligned with the center of ring 60. Harness support 62 is preferably shaped and positioned to minimize any interference with the various movements produced during operation of actuator assembly 14. In the present embodiment, harness support 62 is mounted to the top and sides of ring 60. The major portion of harness support 62 is spaced rearwardly of the plane of ring 60 so that the user will not contact support 62 with his arms or legs during simulation of the activity. In other embodiments of the invention, harness support 62 may have other configurations depending in part upon the constraints of the simulated activity.

An adjustable platform assembly 64 is positioned below harness support 62 to support the user during operation of simulator 10. Since harness support 62 retains harness 12 at a fixed position relative to ring 60, platform assembly 64 may be adjusted to accommodate variations in height for different individuals using simulator 10. After assembly 64 has been calibrated to the appropriate starting position, platform assembly 64 may be used to manipulate the legs relative to the stationary torso. Adjusting platform assembly 64 rather than harness support 62 ensures the center of gravity CG of each user is substantially aligned with the center of ring 60. Moreover, adjusting platform assembly 64 provides greater control over the movement of the legs in simulation of the activity.

In the present embodiment, platform assembly 64 includes a pair of platforms in the form of skis 66 and a piston assembly 68 associated with each ski. Each piston assembly includes a vertical piston 70 pivotally mounted at one end to harness support 62. In the present embodiment, piston 70 is mounted to support 62 by a ball and socket coupling assembly which is substantially aligned with the hip joint of the user so that the movement of ski 66 closely imitates the natural movement of the leg. The opposite end of piston 70 is coupled to a transversely extending platform support 72 of ring 60 by a lateral linear actuator 74 and a rear linear actuator 76. Each ski 66 is pivotally mounted to a ski support 78 by a pivotal coupling assembly 80. The actuators 74 and 76 control the angle of the piston 70 relative to the vertical plane. By actuating the rear actuator 76, the piston 70 may be pivoted about the x-axis to move the skis 66 forward or backward relative to the vertical plane. The lateral actuators 74 control the lateral positioning of the end of piston 70 in the vertical plane. Preferably, coupling assembly 80 is coupled by suitable means (not shown) to control system 16 and actuated to control the angle of the foot relative to the lower leg as well as the orientation of the foot in the horizontal plane by pivoting ski 66 relative to ski support 78. In this embodiment assembly 80 is provided by a universal joint mounted to a spindle carried by the ski support 78. However, it is to be understood that other means may be used to pivotally couple the ski to the ski support 78. Pivotal coupling assemblies 80 are preferably configured to pivot skis 66 in any direction relative to support 78. For example, the coupling assemblies 80 may be used to pivot the skiis 66 relative to the ski support 78, causing the tips of the skiis to pivot inward or outward. Skis 66 may be raised or lowered by sliding cylinder 79 along piston 70. The multiple degrees of movement achieved with the actuators 74 and 76, the cylinders 79 and the pivotal coupling assemblies 80 provide a more realistic experience, allowing platform assembly 64 to accurately simulate skiing movements by tilting ski platforms 66 upward, downward, to the side, turning skis 66, raising and lower skis 66, or a combination thereof to duplicate the actual ski position as a skier travels a slope.

In the present embodiment, coupling assembly 80 may be advantageously used to control the angle of the foot relative to the lower leg. For the skiing application, the ski boot substantially prevents the ankle from pivoting outwardly or inwardly in a side-to-side direction relative to the lower leg. In other applications a harness or other support mechanism may be required to prevent undesired side-to-side tilting of the foot relative to the ankle.

The operation of platform assembly 64 is demonstrated in relation to the examples shown in FIGS. 11–13. Turning to FIG. 11, the left foot of the skier has been raised by moving cylinder 79 to slightly raise ski 66 relative to piston 70 and actuating rear actuator 76 to move the lower end of piston 70 forward. Lateral actuator 74 has been actuated to ensure that the lateral position of piston 70 remains unchanged during the movement. Pivotal coupling assembly 80 has been actuated to tilt ski 66 in a forward direction relative to the pitch axis to maintain the level orientation of the ski platform.

FIGS. 12 and 13 show the skier in the snow plow position. The rear actuators 76 have been actuated to move the lower ends of pistons 70 forward while lateral actuators 74 have been actuated to move the ski supports 78 outward to either side. Support cylinders 79 have been raised to elevate ski supports 78, raising the skis 66 and slightly bending the skiers knees. The pivotal coupling assembly 80 has been actuated to pivot the skis 66 so that the tips of skis 66 are pointed inward.

The skis are preferably moved to the appropriate starting position prior to operation of simulator 10. In the present embodiment, this may be accomplished by providing control system 16 with the individual's height information. Using this information, control system 16 automatically adjusts the height of skis 66 to the starting position. The starting position is recorded and used as a reference point during the simulation. Skis 66 are independently moved during the simulation exercise by selectively actuating lateral actuators 74, rear actuators 76, ski supports 78, cylinders 79 and coupling assemblies 80. Although each leg is independently manipulated by platform assembly 64 of the present embodiment, in other embodiments simulator 10 may include a single platform which simultaneously manipulates both legs.

Inner frame member 40 includes a pair of arm platform assemblies 84 for supporting and manipulating the arms during the simulation. In the present embodiment, arm platform assemblies 84 are provided by robotic arm technology. As is shown particularly in FIGS. 2–4, arm platform assembly 84 generally includes an upper member 86 pivotally coupled to harness support 62 by a joint 88 and a lower member 90 pivotally coupled to upper member 86 by a joint 92. A hand grip 94 with a ski pole 96 depending therefrom is carried by lower member 90. As is shown in FIG. 4, joints 88 are substantially vertically aligned with the shoulder joints of the user while joints 92 are positioned in approximately the same horizontal plane as the user's elbow joints. Joints 88 and 92 preferably provide the same degree of movement as the shoulder and elbow joints of the user to optimize the realism of the simulated arm movements. During the skiing application, the hands are generally not moved to different positions relative to the lower arm. In other activities, the user's hand position may be more important to the simulation and grips 94 may be configured to provide greater control over the position of the hand relative to the lower arm.

The operation of arm platform assemblies 84 are controlled by cable actuators (not shown) which are coupled to control system 16. The cable actuators extend through the interior of assemblies 84 and move upper member 86 and lower member 90 relative to joints 88 and 92, manipulating the users arms to simulate the proper arm positions during the simulated skiing maneuvers. The cable actuators offer the advantage of minimizing the actuator weight to reduce the adverse inertial effects imposed upon the movement of arm platform assemblies 84. However, it is to be understood that other actuators may be used to control the operation of arm platform assemblies 84 if desired.

During the simulation exercise, the user holds hand grips 94 and arm platform assemblies 84 manipulate the user's arms through the simulated arm movements. Since simulator 10 provides a realistic and intense experience, hand grips 94 preferably include a mechanism such as a "dead man" switch (not shown) which allows the user to interrupt the simulation if desired as well as sensors (not shown) for monitoring the pulse rate of the user during the simulation. Other safety mechanisms may be incorporated into hand grips 94 or other components of actuator assembly 14.

It is apparent from the forgoing description that actuator assembly 14 may be used to produce several different movements relative to harness 12. Pivotal or rotational movement of the body about one or more of the x-, y- and z- axes may be achieved by pivoting the appropriate frame members 40, 44 and 46. The legs may be manipulated by activating actuators 74 and 76, rotating ski supports 78, raising and lowering cylinders 79, and activating coupling assemblies 80. The arms may be manipulated by activating the cable actuators to manipulate upper member 86 and lower member 90 relative to joints 88 and 92. By putting each of these movements together, actuator 14 may be used to produce movement accurately simulated an activity such as skiing.

Control system 16, which is coupled to actuator assembly 14 by suitable means (not shown), controls the operation of rotary actuators 48, actuators 74 and 76, ski supports 78, cylinders 79, pivotal coupling assemblies 80, and arm platform assemblies 84, driving actuator assembly 14 to produce the movements necessary for realistically simulating the activity. The model stored within storage device 18 provides a pattern dictating the sequence and degree of movement of each component of actuator assembly 14. In a preferred embodiment of the invention, the model is generated using a recording of an individual's participation in a particular activity. For example, a recording of an athlete skiing a run at a resort in Switzerland is preferably used to generate the model used to simulate the particular run at the Swiss resort. Other models may be created by recording an athlete in competition, an expert skier on a difficult run, an experienced skier skiing an easier or moderate slope with perfect form, etc. Alternatively, in other embodiments of the invention the model may be generated by a computer without using such a recording.

The model may be created by recording several different factors while an individual participates in the actual activity. Various motion capture systems are available for recording a human participant and generating a three-dimensional computer image for animation and computer graphics. The realism of the simulation depends in part upon the number and type of elements which are recorded during the activity. In the present embodiment, angle sensors are positioned at the ankle, knee, hip, elbow and shoulder joints to record the configuration of the arms and legs throughout the activity. Acceleration sensors and level sensors are also applied to the individual's body to continuously measure the speed and posture or inclination of the model skier. Microphones are used to provide a sound recording of the activity. A video camera positioned in a helmet worn by the model skier may be used to record the image viewed by the skier as he moves down the slope. Alternatively, the visual image may be recorded separately by a technician skiing down the slope with a camera. Suitable means such as time stamps or position markers produced by radio transmitters located along the slope may be used to accurately synchronize the different recordings. The various recordings may be supplemented by data on the actual geographic terrain which may be used to simulate different paths down the slope.

Control system 16 is preferably programmed to adjust the operation instructions to accommodate such factors as the physical size and skill level, taking into account differences between the model and the individual using the simulator. Control system 16 uses the data obtained from the various sensors to calculate the operation of actuator assembly 14 required to simulate the modeled movements. For example, the manipulation of the left leg during the simulation is based in part upon the angle of the left knee throughout the activity. The data provided by the sensors includes the angle of the knee, the time at which the knee is moved to a given position, and the length of time during which the knee is held at a given angle. Control system 16 calculates the position of ski 66 when the knee is bent at a given angle and the movements of actuators 74 and 76, ski support 78, cylinder 79 and coupling assemblies 80 required to move the knee to this angle from its previous position. The acceleration and speed of the actuators are based upon the time required for the model skier to move his knee. The measured time increments are used to integrate the calculated instructions for simulating the movement of the left knee with the instructions for the rest of the body.

Control system 16 is preferably programmed to adjust the operation instructions to accommodate such factors as the physical size and skill level, taking into account differences between the model and the individual using the simulator. The intensity of the simulation may be controlled by reducing the speed and acceleration of the movements, the playback rate and/or the extent of selected movements.

Preferably, several different recordings of the model skier are obtained. During the different runs, the skier may modify his path, speed and/or position. The information on the different runs may be used by control system 16 to modify the simulation to accommodate different skill levels or, as is described in more detail below, to react to the user's movements during the simulation.

Control system 16 uses the recorded model to control the operation of actuator assembly 14 and simulate the recorded activity. The video and audio are replayed during the simulation to provide a more realistic simulation using a head mounting display, a dome projection system, or other suitable projection means. If desired, other factors such as the temperature, weather conditions, and the like may be recorded and reproduced during the simulation. Control system 14 may drive actuator assembly to positively control the various movements of the users body, forcing the user through a particular movement pattern. Alternatively, control system 16 may detect and respond to various movements by the user during the simulation.

In the present embodiment, pressure sensors (not shown) similar to those used in recording the model are mounted to the user's boots and skis 66. The body angles may be determined by attaching suitable sensors to the user or deriving the angles from the position of the components of actuator assembly 14. Control system 16 operates actuator assembly 14 to simulate the terrain of the slope, allowing the user to control his movements. Based upon the data obtained from the sensors or component position, control system 14 activates actuator assembly 14 to modify the simulation in response to the user's movements. For example, actuator assembly 14 may modify the simulated terrain to incorporate a turn or a jump, increase or decrease the acceleration or speed at which the user "travels" across the terrain, or simulate a fall. Control system 16 may use the data obtained from the different recordings, mathematical calculations or a combination of the two to operate actuator assembly 14 in response to the user's movements.

Preferably, several scenarios are stored within storage device 18. Using information such as the individuals previous skiing or simulation experience, abilities, physical condition and the like, a scenario having an intensity level suitable for that individual may be selected. Different video images may be generated for a given simulation so that the user may experience the same simulation with different scenery. By way of example, the simulation may include the following movements. Actuator assembly 14 may manipulate the individual into a seated position to simulate the ride in the chair lift. In a preferred embodiment of the invention, an elevator mechanism may be used to raise the entire actuator assembly and provide the sensation riding in a chair lift. Suitable elevator mechanisms may include freight elevators, cherry picker booms, cranes and fork lifts. Preferably, the elevator mechanism is configured so that control system 16 may precisely control the speed and acceleration of the mechanism during the simulation. At the top of the slope, actuator 14 will cause the individual to exit the chair lift. The individual then proceeds down the slope, with platform assembly 64 and frame members 40, 42 and 44 being moved to simulate the skiers progress down the slope. Downward motion may be simulated by using the elevator mechanism to lower actuator assembly 14. Typically, a downward fall may be simulated by suddenly dropping actuator assembly 14 a limited distance, slowing the downward motion and then raising the actuator assembly in preparation of the next downward movement. The entire fall or descent does not need to be recreated by the elevator mechanism. Instead, the sensation created by the drop and the visual image of the scenery viewed during a fall or rapid descent are generally sufficient to cause the user to believe they are continuing to travel in a downward direction.

With the simulation system of the present invention, every movement may be controlled by the actuator assembly to manipulate the individual through the simulated activity. Absolute control over the individual is particularly desirable where the simulation is used for entertainment purposes such as when the simulation recreates the experiences of an Olympic skiing event. The simulation may be interactive with actuator assembly 14 detecting and reacting to the individual's movements. When the simulator is used for instructional purposes, control system 16 may be programmed to interrupt the simulation when the individual's movements deviate from the model retained in storage device 18 and provide verbal instructions on the correct movement response. If desired, control system 16 may simulate a fall to call the user's attention to the error. Other instructional techniques which may be used include manipulating the user to the correct position, repeating the particular sequence, and the like.

FIGS. 14 and 15 illustrate another embodiment of the invention in which simulator 120 is adapted to simulate a golf swing. This embodiment of the invention is particularly suitable for instructing a student on the fundamentals of the proper swing for driving, putting and chipping the ball. In addition, simulator 120 may be used by experienced individuals to enhance their golf game by developing muscle memory of their optimum swing. As is shown particularly in FIG. 14, simulator 120 generally includes a harness assembly 122 which engages the body of the user and actuating means for manipulating the user through the movements required for the desired swing. In this modification of the invention, the actuating means is provided by a first actuator assembly 124 which controls the arms and a second actuator assembly 126 which controls movement of the torso during the swing. A control system (not shown) is coupled to actuator assemblies 122 and 124 by suitable means for driving the actuator assemblies according to a simulation model retained in the storage device associated with the control system.

First actuator assembly 124 includes a club 132 which is gripped by the user throughout the simulation in the same manner as a golfer holds a golf club. Club 132 preferably provides a substantially accurate representation of the length and weight distribution of a golf club which is suitable for a particular user to enhance the realism of the situation. Preferably, club 132 is separable from actuator assembly 124 so that different clubs may be employed to accommodate different types of golf strokes as well as the height, strength, and style of different individuals using simulator 120. Club 132 may be designed particularly for simulator 120 as shown or actuator assembly 124 may be adapted to receive the user's own clubs. Characteristics of club 132 selected for a given simulation, such as the length, weight and type of the club, may be entered into a control system so that the control system may make any adjustments which may be required during the operation of actuator assemblies 124 and 126.

Club 132 is mounted to an actuator arm 134 by a coupling device 136. As is shown particularly in FIG. 15, the curved shape of the actuator arm 134 ensures the arm 134 clears the individual's head during the back swing. However, it is to be understood that the configuration of the actuator arm may be varied in accordance with this invention. Preferably, coupling device 136 releasably secures club 132 to actuator arm 134 and permits pivotal movement of club 132 relative to the engaged portion of actuator arm about the x-, y-, and z-axes. However, a club 132 which is permanently attached to actuator arm 132 is within the scope of this invention. Such a permanent club configuration preferably includes means for adjusting the length and weight of the club without removing the club from arm 134.

Actuator arm 134 is coupled to a drive assembly 138. Drive assembly 138 controls pivotal movement of arm 134 about the x-, y- and z-axes, translational movement of arm 134 in the direction of the y-axis, and movement of club 132 relative to arm 134. In the illustrated modification, actuator arm 134 includes a shaft 140 which is supported in an orientation substantially aligned with the y-axis as is shown in FIG. 14. A first motor 142 of drive assembly 138 engages shaft 140 and pivots the shaft 140 about the y-axis, rotating arm 134 to carry club 132 through the swing motion. A linear actuator 144 coupled to shaft 140 and first motor 142 moves shaft 140 back and forth relative to first motor 142 in the direction of the y-axis. Linear actuator 144 adjusts the initial position of club 132 relative to the individual prior to the simulation. In addition, linear actuator 144 makes the necessary adjustments to the location of the grip of club 132 throughout the swing.

A second motor 146 is coupled to first motor 142 via pivotal coupling bracket 148. Operation of second motor 146 causes first motor 142 and the engaged shaft 142 to pivot about the x-axis to adjust the position of the actuator arm to accommodate different club paths for different strokes. A third motor 150 is pivotally coupled to first motor 142 and shaft 140 of actuator arm 134 by bracket 148. Third motor 150 pivots first motor 142 and the engaged shaft 140 relative to the z-axis. Third motor 150 is carried by a vertically extending post 152 which is slidably supported by a base 154. In the this embodiment, base 154 includes a console 155 which may be used to access the control system and enter required information, initiate or interrupt the simulation, etc. In other modifications of the invention, the console may be located at a position remote from actuator 124. A second linear actuator 156 selectively extends and retracts post 152 relative to base 154 to adjust the height of the grip of club 132 relative to the user. Actuator cables 158 extend through shaft 140 and actuator arm 134 to control the movement of club 132 relative to arm 134.

A golf club generally travels through a swing plane which is oriented at an angle relative to the horizontal and vertical planes. As a result, the location of coupling device 136 (or the gripped portion of club 132) with respect to the x-, y-, and z-axes changes throughout the swing. Motors 142 and 150 and linear actuators 144 and 156 cooperate to control the position of coupling device 136 during the swing simulation. Movement of club 132 relative to actuator arm 134 is controlled by cable actuators 158. The control system controls the operation of motors 142, 146 and 150, linear actuators 144 and 156 and actuator cables 158 in accordance with the model stored in the storage device.

While first actuator 124 moves the individual's arms through the swing, second actuator 126 manipulates the shoulders and hips to simulate a proper swing. Harness assembly 122 includes an upper portion 166 which extends around the shoulders and upper body and a lower portion 168 which engages the hip area of the individual. As is shown particularly in FIG. 14, upper portion 166 is separate from lower portion 168 of harness assembly 122 so that the movement of the shoulders and hips may be independently controlled during the swing.

Upper portion 166 and lower portion 168 of harness assembly 122 are mounted to a pair of actuator arms 170 carried by a support post 172. Each actuator arm 170 includes a pivotal coupling device 174 which pivotally mounts actuator arm 170 to harness assembly 122. Coupling device 174 permits side-to-side, up-and-down and rotational movement of the associated portion of harness assembly 170 relative to actuator arm 170. Since the weight of the individual is not supported by harness assembly 122 or actuator assembly 126 in this application, the y-shaped actuator arms 170 are pivotal upward and downward relative to the longitudinal axis of post 172 to accommodate variations in the heights of different individuals. Actuator arms 170 also include linear actuators (not shown) for retracting and extending the arms 170 relative to the support post 172. Support post 172 include a pair of spaced sleeves 176 which are independently rotatably relative to the longitudinal axis of post 172. By pivoting sleeves 176, actuator arms 170 move the upper and lower portions of harness assembly 122 relative to post 172 as is indicated by the arrows. Motors 175 are carried by the support post 172 to control movement of the sleeves 176 and actuator arms 170 about the longitudinal axis of the support post 172. Suitable means (not shown) such as actuator cables and the like control the movement of coupling devices 174, and the linear actuators of actuator arms 170. The motors 175 and other actuating means are coupled to the control system, which controls the operation of the motors 175 and other actuating means to produce the desired movements of the shoulders and hips during the swing.

A golf swing requires movement of the golfer's arms, shoulders, hips, and legs. First actuator assembly 124 manipulates the arms throughout the swing. Upper portion 166 of harness assembly 122 manipulates the shoulders while lower portion 168 manipulates the hips independently of the torso to attain the proper body position throughout the swing. By controlling the hip position, lower portion 168 of harness assembly 122 exerts sufficient control over the individual's legs to ensure the legs are moved appropriately throughout the swing. The control system controls the operation of the actuating means driving coupling devices 174, actuator arms 170, and sleeves 176 in accordance with the model retained in the storage device.

In the illustrated embodiment, simulator 120 includes a sensor pad 180 for supporting the individual during the simulation. Sensor pad 180 preferably includes a grid array of pressure sensors to monitor the position of the individual's feet and the weight distribution during the swing. The pressure sensors are coupled to the control system, which compares the measurements with the model retained in the storage device to determine whether the individual shifting his weight between his left and right legs as required for a proper swing. In the present embodiment, sensor pad 180 includes a retractable projection 182 which simulates the golf ball and retracts into a hole in sensor pad 180 when hit by club 132. Alternatively, retractable projection 182 may be replaced by an actual ball positioned on sensor pad 180. The individual may hit the ball into a net or, if desired, simulator 120 may be located at a driving range.

As with the previously described embodiment, the control system preferably uses a model derived from a recording of an actual participant swinging a golf club to drive actuators 124 and 126. In the present embodiment, the recording is generated by positioning markers at the knees, elbows, shoulders and hips of the actual participant. Two or more video cameras are used to record the participant as he swings the club, with the camera recording the time on each frame of the video. The position of the cameras during the recording depends upon the type of swing as well as the number and type of cameras employed. In addition, other recording instruments may be employed instead of video cameras as is known in the art. A computer generates a model from the recording by tracking the position of the markers throughout the swing to determine the actual position of the knees, elbows, shoulders and hips at each instance during the swing. Using the model, a program is generated to drive actuators 124 and 126 to substantially reproduce the body movements during the swing.

The subject used to prepare the model may be an experienced or professional golfer. Alternatively, the model may be specifically tailored for the individual using simulator 120 by recording the individual actually swinging the club over a period of time. The recording is analyzed to identify a swing which most closely represents the optimum swing for the individual and the optimum swing is used to prepare the simulation model. Using the prepared model, simulator 120 repeatedly drives the individual through the proper swing to create muscle memory of the swing so that the individual will more consistently reproduce the desired swing motion during a game of golf. Preparing a model from the actual individual using simulator 120 is of particular advantage for golf where the swing is often personal to a particular individual. Forcing an individual to reproduce another person's golf swing may have an adverse effect on their swing.

In the embodiment shown in FIGS. 1–13, actuator assembly 14 supports the user and is capable of exerting total control over the user's body to rapidly produce the movements required for the simulation and quickly change the user's spacial orientation to provide a realistic simulation of a skiing experience. In the modification of the invention shown in FIGS. 14 and 15, actuators 124 and 126 do not support or overpower the user. Instead, actuators 124 and 126 provide only enough force to encourage the user to move his body and/or the club through the proper movements. If the user desires, he may resist and overcome the control exerted by actuators 124 and 126. As with the previous embodiment, sensors may be mounted to actuators 124 and 126 and coupled to the control system to monitor the movement and determine when the individual has moved to an improper position during the swing. The control system may be programmed to provide instructions to correct various errors when they occur.

FIG. 16 illustrates another embodiment of a simulator 200 for simulating the activity of skiing. Simulator 200 generally includes a harness 202 which is mounted to the torso of the user, an actuator assembly 204 and a control system for controlling operation of the actuator assembly (not shown). In the embodiment shown in FIG. 16, actuator assembly 204 includes an inner frame member 206 coupled to a conventional motion platform 208. Inner frame member 206 is substantially identical to the inner frame member 40 of the embodiment shown in FIGS. 1–13 and will not be described in detail. Three pairs of cylinders 210, 212 and 214 couple inner frame member 206 to motion platform 208. The individual cylinders 210, 212 and 214 are selectively actuated to rotate inner frame 206 about the x-, y-, and z-axes. With this invention, actuator assembly 204 is configured so that the rotational axes are substantially coincident with the center of gravity CG. Aligning the rotational axes with the center of gravity is particularly important in that the user's spacial orientation may be rapidly changed using only a minimal amount of force. The reproduction of such sudden movements are critical to providing a realistic ski simulation. With the embodiment shown in FIGS. 1–13, actuator assembly 14 may be activated to provide a full 360° rotation relative to one or more of the axes, allowing the user to experience a wide variety of acrobatic maneuvers. Unlike the embodiment of FIGS. 1–13, actuator assembly 204 may not be used to reproduce 360° of rotation. However, cylinders 210, 212 and 214 of actuator assembly 204 may be actuated to produce linear movement relative to one or more of the axes if desired. With the embodiment of FIGS. 1–13, additional mechanisms, such as an elevator mechanism and the like, are required to produce linear movement. In both ski simulation embodiments, the actuator assembly completely supports the user and may exert total control over the user throughout the simulation.

With the simulator of the present invention, a user may experience an activity without the expense or risk of injury associated with the actual activity. The user would also be able to experience activities which exceed their skill level or physical condition. In addition, the individual may use simulator 10 as an instructional tool in developing or improving the necessary skills to successfully complete the activity. The simulator of the present invention is not to be limited to the activities of downhill skiing and golf. Instead, the simulation system may be used for a variety of activities including, but not limited to, cross country skiing, water skiing, surfing, sailboarding, snowboarding, tennis, racquet ball, running, walking, acrobatics, trapeze, gymnastics, baseball, football, dancing, bowling as well as any other physical activity. In addition to recreational activities, the simulator is particularly suitable for use in rehabilitation and physical therapy applications.

It is to be understood that the simulation system of the present invention is not limited to the specific embodiments illustrated in the Figures. The configuration of the harness support and actuating means may vary depending in part upon the physical activity being simulated. One advantage of the previously described embodiments is that the actuating means are configured to provide several degrees of movement, creating a substantially realistic simulation. However, it is within the scope of the invention to provide actuating means which does not reproduce the full range of motion of the preferred embodiments. The degrees of movement required to provide a sufficiently realistic simulation depend in part upon the constraints of the particular activity.

What is claimed:

1. A method of simulating a human activity by manipulating a human body having limbs and a torso, comprising the steps of:

supporting a body on an actuator assembly formed for manipulation of the body by mounting a support harness to the torso of a body and substantially supporting the weight of the body from said support harness leaving the limbs of the body movable relative to the torso;

positioning at least one actuator of said actuator assembly in contact with selected limbs of the body; and driving said actuator assembly during said supporting step using a model of a human activity stored in a storage device provided in said actuator assembly to produce motion of selected limbs of the body relative to the torso as determined by said model in simulation of the human activity.

2. The method of claim 1, and the step of:

prior to said driving step, generating said model in a format suitable for driving said actuator assembly, and storing said model in said storage device.

3. The method of claim 2 wherein, said recording step includes recording at least one sensation experienced by the human while performing said human activity.

4. The method of claim 2 wherein, said generating step includes determining the relative position of said limbs during said human activity, and said driving step includes configuring said actuator assembly for producing motion of selected ones of said limbs to said relative position during simulation of said human activity.

5. The method of claim 2 wherein, said generating step includes determining the forces exerted on said body during said human activity, and said driving step includes configuring said actuator assembly to substantially reproduce said forces exerted on said body during said human activity.

6. The method of claim 2 wherein, said generating step includes determining the forces exerted by said body during said human activity, and said driving step includes configuring said actuator assembly to substantially reproduce said forces exerted by said body during said human activity.

7. The method of claim 2 wherein, said generating step includes modeling the movements of a skier, and said driving step includes configuring said actuator assembly to simulate said movements of said skier.

8. The method of claim 2 wherein, said generating step includes modeling the movements of a golfer, and said driving step includes configuring said actuator assembly to simulate said movements of said golfer.

9. The method of claim 1, and the step of prior to said driving step, modifying said model of said human activity to incorporate at least one characteristic of the human supported on said actuator assembly.

10. The method of claim 1 wherein, said driving step includes driving said actuator assembly to manipulate selected ones of said limbs to a plurality of predetermined positions relative to said torso.

11. The method of claim 1 wherein, said driving step includes driving said actuator assembly to manipulate a first portion of said torso relative to a second portion of said torso.

12. The method of claim 1 wherein, said driving step includes driving said actuator assembly to independently produce motion of selected ones of said limbs.

13. The method of claim 1 wherein, said limbs include the arms and legs of said body, and said driving step includes driving said actuator assembly to produce motion of said arms and said legs relative to said torso.

14. The method of claim 1 wherein, said driving step includes driving said actuator assembly to produce motion of said body about the center of gravity of said body relative to at least one of three perpendicular axes.

15. The method of claim 1, and the step of monitoring the movement of said body, and wherein, said driving step includes driving said actuator assembly to produce a reactive motion in response to said movement of said body.

16. A method of simulating a human activity by manipulating a human body having limbs and a torso, comprising the steps of:

supporting a body on an actuator assembly formed for manipulation of the body by mounting a support to the torso of a body and supporting the body therefrom leaving the limbs of the body movable relative to the torso;

positioning at least one actuator of said actuator assembly in contact with selected limbs of the body;

driving said actuator assembly during said supporting step using a model of a human activity stored in a storage device provided in said actuator assembly to produce motion of selected limbs of the body relative to the torso as determined by said model in simulation of the human activity;

prior to said driving step, generating said model in a format suitable for driving said actuator assembly by recording the activity of a human while performing said human activity in an unconstrained condition, and storing said model in said storage device.

17. The method of claim 16 wherein, said recording step is accomplished by recording the activity of the human to be supported on said actuator assembly.

18. The method of claim 17 wherein, said recording step is accomplished by making a video recording and digitizing said video recording to provide said model.

19. A method of simulating a human activity by manipulating a human body having limbs and a torso, comprising the steps of:

mounting a support to a torso of a body, said support being coupled to an actuator assembly and rotatable relative to three perpendicular axes, mounting an instrument used in a human activity to an arm member coupled to said actuator assembly for rotational movement of said arm member about selected ones of three perpendicular axes and translational movement of said arm member about selected ones of the three perpendicular axes, said instrument being rotatable relative to said arm member about three perpendicular axis, driving said actuator assembly using a model of a selected human activity stored in said actuator assembly to selectively produce motion of said support relative to at least one of the three perpendicular axes, rotational and translational motion of said arm member, and rotational motion of said instrument relative to said arm member in simulation of the human activity.

20. The method of claim 19, and the step of supporting said body on said actuator assembly.

21. The method of claim 20 wherein, said driving step includes driving said actuator assembly to produce motion of said body in simulation of said human activity.

22. The method of claim 19, and the steps of:

prior to said driving step, modeling said human activity in a format suitable for driving said actuator assembly and storing the model in a storage device provided in said actuator assembly, and wherein, said driving step includes configuring said actuator assembly to produce said motion in simulation of said human activity.

23. The method of claim 22 wherein, said modeling step includes recording a demonstration model of said human activity and storing the recorded demonstration model of said human activity in said storage device.

24. The method of claim 22 wherein, said modeling step includes determining the position of said body in relation to the environment during said human activity while the human is free to perform said human activity, and said driving step includes configuring said actuator assembly to produce motion of said body which simulates said position of said body.

25. The method of claim 22 wherein, said modeling step includes determining the forces exerted on said body during said human activity, and said driving step includes configuring said actuator assembly to simulate said forces exerted on said body during said human activity.

26. The method of claim 19 wherein, said driving step includes driving said actuator assembly to manipulate a first portion of said torso relative to a second portion of said torso.

27. The method of claim 19 wherein, said driving step includes configuring said actuator assembly to simulate said movements of said human activity.

28. A simulation apparatus for simulating a human activity by manipulating a human body having limbs and a torso, said simulation apparatus comprising:

a support mountable to a torso of a body for supporting the body, arm member configured to support an instrument used in a selected human activity, said arm member being mounted for rotational and translational movement of said arm member relative to three perpendicular axes, said arm member including a pivotal connector mountable to an instrument and configured for rotational movement of an instrument mounted to said pivotal connector about three perpendicular axes, an actuator system coupled to said support harness, said arm member and said pivotal connector, said actuator system including a storage device having a model of a selected human activity stored therein, said actuator system selectively producing movement of said support harness, selectively producing rotational and translation movement of said arm member relative to the three perpendicular axes, and selectively producing rotational movement of the instrument mounted to said arm member to manipulate a body in simulation of the selected human activity in accordance with said model in said storage device.

29. The simulation apparatus of claim 28 wherein, said support is a harness assembly carried by said actuator system.

30. The simulation apparatus of claim 29 wherein, said harness assembly includes a first harness mountable to second harness mountable to the legs of a body.

31. The simulation apparatus of claim 28 wherein, said support is mountable to a first portion of a torso and said actuator system is coupled to said support harness to produce motion of the first portion of the torso engaged by said support relative to a second portion of the torso.

32. The simulation apparatus of claim 31 wherein, said support includes a first harness mountable to the first portion of a torso and a second harness mountable to a second portion of the torso and said actuator system is coupled to said first harness and said second harness to produce relative movement of said first harness and said second harness to manipulate the first portion of the torso engaged by said first harness and the second portion of the torso engaged by said second harness.

33. The simulation apparatus of claim 28, and further comprising a control system coupled to said actuator system for driving said actuator system, said control system including said storage device.

34. The simulation apparatus of claim 28 wherein, said actuator system includes a second pivotal connector mounted to said support harness and configured for rotational movement of said support harness about three perpendicular axes, said actuator system driving said second pivotal connector to selectively produce rotational movement of said support harness about the three perpendicular axes.

35. The simulation apparatus of claim 34 wherein, said support harness includes a first harness and a second harness spaced from said first harness, and said actuator system includes a pivotal connector mounted to each of said first harness and said second harness.

36. The simulation apparatus of claim 28 wherein, said actuator system has rotational actuators positioned to produce rotational motion about selected ones of three intersecting axes, and linear actuators positioned to produce translational motion about selected ones of the three intersecting axes.

37. The simulation apparatus of claim 28, and further comprising an instrument mounted to said pivotal connector, said instrument being rotatable relative to said arm member about three perpendicular axes.

38. A simulation apparatus for simulating a human activity by manipulating a human body having limbs and a torso, said simulation apparatus comprising:

a frame member having a support harness mountable to the torso of a body and a first actuator system carried by said frame, said first actuator system being configured and positioned to engage the limbs of a body supported by said support harness and move the limbs relative to said support harness in simulation of a selected human activity, a second actuator system coupled to said frame member, said second actuator system being actuable to manipulate said frame member for movement of said support harness about at least one of three perpendicular axes, and a control system coupled to drive said first actuator system and said second actuator system and including a storage device having a model of a selected human activity stored therein.

39. The simulation apparatus of claim 38 wherein, said frame member includes at least one leg platform spaced from said support harness and positioned for supporting the legs of a body supported by said support harness.

40. The simulation apparatus of claim 39 wherein, said frame member includes a pair of leg platforms each positioned to engage one leg of a body supported by said support harness, said first actuator system being coupled to said leg platforms to independently move each of said leg platforms relative to said support harness for producing motion of the legs relative to the torso of a body supported by said support harness.

41. The simulation apparatus of claim 39 wherein, said leg platform is mounted for pivotal movement in at least one direction.

42. The simulation apparatus of claim 39 wherein, said leg platform simulates a ski.

43. The simulation apparatus of claim 38 wherein, said frame member includes at least one arm platform spaced from said support harness and positioned for supporting the arms of a body supported by said support harness.

44. The simulation apparatus of claim 38 wherein, said second actuator system includes a second frame member coupled to the first-mentioned frame member with the first-mentioned frame member being movable relative to said second frame member for movement of said support harness about a first one of said axes, said second frame member being mounted for movement of said support harness about a second one of said axes, and a third frame member coupled to said second frame member and mounted for movement of said support harness about a third one of said axes.

45. The simulation apparatus of claim 44 wherein, said actuator assembly includes at least one rotary actuator associated with each of the frame members, said rotary actuator being formed for producing motion of the associated one of said frame members.

46. The simulation apparatus of claim 43 wherein, said frame member includes a pair of arm members each positioned to engage one arm, said first actuator system being coupled to said arm platforms to independently move said arm members relative to said support harness for producing motion of the arms of a body supported by said support harness.

47. The simulation apparatus of claim 38 wherein, said first actuator system includes at least one actuator for producing motion of the selected limbs relative to said support harness.

48. The simulation apparatus of claim 47 wherein, said first actuator system includes at least one actuator associated with each of the selected limbs for independently producing motion of each of the selected limbs relative to said support harness.

49. A simulation apparatus for simulating a human activity by manipulating a human body having limbs and a torso, said simulation apparatus comprising:

an arm member configured to support an instrument used in a selected human activity, said arm member including a second pivotal connector mountable to an instrument and configured for rotational movement of an instrument mounted to said pivotal connector about three perpendicular axes, an actuator system coupled to said arm member, said actuator system having rotational actuators positioned to produce rotational motion about selected ones of three intersecting axes, and linear actuators positioned to produce translational motion about selected ones of the three intersecting axes, said actuator system including a storage device having a model of a selected human activity stored therein, said actuator system selectively driving said rotational actuators and said linear actuators to manipulate the instrument in simulation of the selected human activity in accordance with said model in said storage device.

50. The simulation apparatus of claim 49, and further comprising a support harness mountable to a torso of a body and coupled to said actuator system, and said actuator system selectively producing movement of said support harness to manipulate a torso in simulation of a selected human activity.

51. A method of simulating a human activity by manipulating a human body having limbs and a torso, comprising the steps of:

supporting a body on an actuator assembly formed for manipulation of the body by mounting a support to the torso of a body and supporting the body therefrom leaving the limbs of the body movable relative to the torso;

positioning at least one actuator of said actuator assembly in contact with selected limbs of the body;

driving said actuator assembly during said supporting step using a model of a human activity stored in a storage device provided in said actuator assembly to produce motion of selected limbs of the body relative to the torso as determined by said model in simulation of the human activity; and prior to said driving step, modifying said model of said human activity to incorporate at least one characteristic of the human supported on said actuator assembly.

52. A method of simulating a human activity by manipulating a human body having limbs and a torso, comprising the steps of:

supporting a body on an actuator assembly formed for manipulation of the body by mounting a support to the torso of a body and supporting the body therefrom leaving the limbs of the body movable relative to the torso;

positioning at least one actuator of said actuator assembly in contact with selected limbs of the body;

driving said actuator assembly during said supporting step using a model of a human activity stored in a storage device provided in said actuator assembly to produce motion of selected limbs of the body relative to the torso as determined by said model in simulation of the human activity;

monitoring the movement of said body; and driving said actuator assembly to produce a reactive motion in response to said movement of said body.

* * * * *